(12) United States Patent
Hu et al.

(10) Patent No.: US 11,683,487 B2
(45) Date of Patent: Jun. 20, 2023

(54) BLOCK-BASED ADAPTIVE LOOP FILTER (ALF) WITH ADAPTIVE PARAMETER SET (APS) IN VIDEO CODING

(71) Applicant: QUALCOMM Incorporated, San Diego, CA (US)

(72) Inventors: Nan Hu, San Diego, CA (US); Vadim Seregin, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 386 days.

(21) Appl. No.: 16/822,990

(22) Filed: Mar. 18, 2020

(65) Prior Publication Data
US 2020/0314424 A1    Oct. 1, 2020

Related U.S. Application Data

(60) Provisional application No. 62/824,259, filed on Mar. 26, 2019.

(51) Int. Cl.
*H04N 19/117*     (2014.01)
*H04N 19/186*     (2014.01)
(Continued)

(52) U.S. Cl.
CPC ......... *H04N 19/117* (2014.11); *H04N 19/176* (2014.11); *H04N 19/186* (2014.11); *H04N 19/70* (2014.11)

(58) Field of Classification Search
CPC .... H04N 19/70; H04N 19/176; H04N 19/174; H04N 19/117; H04N 19/186;
(Continued)

(56) References Cited

U.S. PATENT DOCUMENTS 9,001,883 B2    4/2015    Tsai et al.
9,270,989 B2    2/2016    Hannuksela
(Continued)

FOREIGN PATENT DOCUMENTS

| GB | 2581855 A | * | 9/2020 | ........... H04N 19/114 |
| WO | WO-2013063962 A1 | * | 5/2013 | ........... H04N 19/174 |
| WO | WO-2013144144 A1 | * | 10/2013 | ........... H04N 19/117 |

OTHER PUBLICATIONS

Bossen F., et al., "JEM Software Manual," Joint Collaborative Team on Video Coding (JCT-VC) of ITU-T SG16 WP3 and ISO/IEC JTC1/SC29/WG11, Document: JCTVC-Software Manual, Retrieved on Aug. 3, 2016, pp. 1-29.
(Continued)

*Primary Examiner* — Robert J Hance
(74) *Attorney, Agent, or Firm* — Shumaker & Sieffert, PA

(57) ABSTRACT

A method of decoding video data including decoding, from a video bitstream for which adaptive loop filtering is enabled for luma blocks of one or more of a picture, a slice, a tile, or a tile group, a first syntax element indicating a number of adaptive parameter sets for the luma blocks, decoding a plurality of first adaptive parameter set indices for the luma blocks based on the number of adaptive parameter sets for the luma blocks, and decoding, from the video bitstream for which adaptive loop filtering is enabled for chroma blocks of the one or more of the picture, the slice, the tile, or the tile group, a second adaptive parameter set index for the chroma blocks.

36 Claims, 9 Drawing Sheets

US 11,683,487 B2

Page 2

(51) Int. Cl.
H04N 19/70 (2014.01)
H04N 19/176 (2014.01)
(58) Field of Classification Search
CPC .... H04N 19/82; H04N 19/503; H04N 19/463; H04N 19/426; H04N 19/31
See application file for complete search history.

(56) References Cited

U.S. PATENT DOCUMENTS

| | | | |
|---|---|---|---|
| 9,538,200 | B2 | 1/2017 | Van Der Auwera et al. |
| 10,298,946 | B2 | 5/2019 | Li et al. |
| 2008/0178219 | A1* | 7/2008 | Grannan ............... H04L 67/306 725/41 |
| 2013/0101018 | A1* | 4/2013 | Chong ................... H04N 19/82 375/240.02 |
| 2013/0343465 | A1 | 12/2013 | Chen et al. |
| 2018/0192050 | A1* | 7/2018 | Zhang .................. H04N 19/117 |
| 2019/0373258 | A1 | 12/2019 | Karczewicz et al. |
| 2020/0084444 | A1 | 3/2020 | Egilmez et al. |
| 2020/0296365 | A1* | 9/2020 | Chen .................... H04N 19/182 |

OTHER PUBLICATIONS

Bross B., et al., "Versatile Video Coding (Draft 7)", Joint Video Experts Team (JVET) of ITU-T SG 16 WP 3 and ISO/IEC JTC 1/SC 29/WG 11, JVET-P2001-vE, 16th Meeting: Geneva, CH, Oct. 1-11, 2019, 488 pages.
Chen J., et al., "Algorithm Description of Joint Exploration Test Model 1," 1, JVET Meeting, Oct. 19-21, 2015, Geneva;(The Joint Video Exploration Team of ISO/IEC JTC1/SC29/WG11 and ITU-T SG.16); URL: http://phenix.int-evry.fr/jvet/ ,, No. JVET-A1001 Feb. 24, 2016 (Feb. 24, 2016), XP030150000, 27 pages.
Chen J., et al., "JVET-G1001: Algorithm Description of Joint Exploration Test Model 7 (JEM7)", JVEt-G1001-V1, Joint Video Exploration Team (JVET)of ITU-T SG 16 WP 3 and ISO/IEC JTC 1/SC 29/WG 11, 7th Meeting, Jul. 13, 2017-Jul. 21, 2017, Torino, Aug. 19, 2017 (Aug. 19, 2017), 51 Pages, XP030150980, pp. i-iv, Retrieved from the Internet: URL: http://phenix.int-evry.fr/jvet/doc_end_user/documents/7_Torino/wg11/JVET-G0001-v1.zip, p. 20, Paragraph 2.3.7-p. 23, Paragraph 2.3.7.6, p. 17, Paragraph 2.3.5-p. 18, section 2, sections 2.1.1. 2.3.1. Abstract section "2.3.6. affine motion compensation prediction" section "2.3.8. Bi-directional optical flow".
Fu C-M., et al., "Sample Adaptive Offset in the HEVC Standard", IEEE Transactions on Circuits and Systems for Video Technology, Institute of Electrical and Electronics Engineers, USA, Dec. 1, 2012, vol. 22, No. 12, pp. 1755-1764, XP011487153, ISSN: 1051-8215, DOI:10.1109/TCSVT.2012.2221529.
Hu N., et al., "CE5: Coding Tree Block based Adaptive Loop Filter (CE5-4)", Joint Video Experts Team (JVET) of ITU-T SG 16 WP 3 and ISO/IEC JTC 1/SC 29/WG 11, JVET-N0415-v2, 14th Meeting: Geneva, CH, Mar. 19-27, 2019, 16 pages.
International Search Report and Written Opinion—PCT/US2020/023655—ISAEPO—dated May 27, 2020.
ITU-T H.223, Series H: Audiovisual and Multimedia Systems, Infrastructure of Audiovisual Services—Transmission Multiplexing and Synchronization, Multiplexing Protocol for Low Bit Rate Multimedia Communication, The International Telecommunication Union, Jul. 2001, 74 Pages.

ITU-T H.265, "Series H: Audiovisual and Multimedia Systems, Infrastructure of Audiovisual Services—Coding of Moving Video, High efficiency Video Coding," The International Telecommunication Union. Dec. 2016, 664 Pages.
Karczewicz M., et al., "Geometry Transformation-based Adaptive In-Loop Filter," Picture Coding Symposium, IEEE, Dec. 4-7, 2016, pp. 1-5, XP033086856, DOI: 10.1109/PCS.2016.7906346, [retrieved on Apr. 19, 2017], Section III.
Li (ZTE) M., et al., "Multiple Adaptation Parameter Sets Referring", 7. JCT-VC Meeting, 98. MPEG Meeting, Nov. 21, 2011-Nov. 30, 2011, Geneva, (Joint Collaborative Team on Video Coding of ISO/IEC JTC1/SC29/WG11 and ITU-T S6.16), URL: http://wftp3.itu.int/av-arch/jctvc-sitei, No. JCTVC-G33Z, Nov. 8, 2011 (Nov. 7, 2011), XP030110316, pp. 1-7, the whole document.
Norkin A., et al., "HEVC Deblocking Filter", IEEE Transactions on Circuits and Systems for Video Technology, Dec. 1, 2012 (Dec. 1, 2012), vol. 22, No. 12, pp. 1746-1754, XP011487156.
Ohm J-R., et al., "MPEG-4 Advanced Video Coding", MPEG Doc#: N7314, Jul. 2005, 11 Pages.
Seregin (Qualcomm) V., et al., "AHG17: Multiple ALF APS for Chroma", 15. JVET Meeting, Jul. 3, 2019-Jul. 12, 2019, Gothenburg, (The Joint Video Exploration Team of ISO/IEC JTC1/SC29/WG11 and ITU-TSG.16), No. JVET-O0247, Jun. 26, 2019 (Jun. 26, 2019), XP030218953, 4 Pages, Retrieved from the Internet: URL: http://phenix.int-evry.fr/jvet/doc_end_user/documents/15_Gothenburg/wg11/JVET-O0247-v1.zip JVET-O0247.docx, [retrieved on Jun. 26, 2019], the whole document.
Tsai C-Y., et al., "Adaptive Loop Filtering for Video Coding," IEEE Journal of Selected Topics in Signal Processing, vol. 7 (6), Dec. 1, 2013, pp. 934-945, XP055265962, US ISSN: 1932-4553, DOI: 10.1109/JSTSP.2013.2271974, the whole document.
Wang Y., et al., "AHG17: On Header Parameter Set (HPS)", Joint Video Experts Team (JVET) of ITU-T SG 16 WP 3 and ISO/IEC JTC 1/SC 29/WG 11, JVET- M0132-v2, 13th Meeting: Marrakech, MA, Jan. 9-18, 2019, JVET-M0132, pp. 1-7.
Wang Y-K. et al., "High Efficiency Video Coding (HEVC) Defect Report", Joint Collaborative Team on Video Coding (JCT-VC) of ITU-T SG 16 WP 3 and ISO/IEC JTC 1/SC 29/WG 11, Doc. JCTVC-N1003_v1, 14th Meeting, Vienna, AT, Jul. 25-Aug. 2, 2013, 311 pages, please consider section 8.5.3.2.6 on p. 125, section 8.5.3.2.7 on pp. 126-129, and section 8.5.3.2.8 on pp. 129 and 130.
Hu (Qualcomm) N, et al., "CE2.3 and CE2.4: Fixed Filters, Temporal Filters, CU-Level Control and Low-Latency Encoder for ALF", 12. JVET Meeting, Oct. 3, 2018-Oct. 12, 2018, Macao, (The Joint Video Exploration Team of ISO/IEC JTC1/SC29/WG11 and ITU-T SG. 16), No. JVET-L0391, Oct. 1, 2018 (Oct. 1, 2018), 37 Pages, XP030194208, Retrieved from the Internet: URL: http://phenix.int-evry.fr/jvet/doc_end_user/documents/12_Macao/wg11 /JVET-L0391-v2.zip JVET-L0391-v2.docx [retrieved on Oct. 1, 2018] section 2.1.2.
Hu N., et al., "Coding Tree Block based Adaptive Loop Filter", Joint Video Experts Team (JVET) of ITU-T SG 16 WP 3 and ISO/IEO JTC 1/SC 29/WG 11, JVET-M0429, 13th Meeting: Marrakech, MA, Jan. 9-18, 2019, pp. 1-12.
Karczewicz M., et al., "CE2-related: CTU Based Adaptive Loop Filtering", JVET-K0382-v3, Joint Video Experts Team (JVET)of ITU-T SG 16 WP 3 and ISO/IEC JTC 1/SC 29/WG 11, 11th Meeting: Ljubljana, SI, Jul. 10-18, 2018, pp. 1-4.

* cited by examiner

BLOCK-BASED ADAPTIVE LOOP FILTER (ALF) WITH ADAPTIVE PARAMETER SET (APS) IN VIDEO CODING

This application claims the benefit of U.S. Application No. 62/824,259, filed Mar. 26, 2019, the entire content of which is incorporated by reference herein.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the recently finalized High Efficiency Video Coding (HEVC) standard, and extensions of such standards. The video devices may transmit, receive, encode, decode, and/or store digital video information more efficiently by implementing such video compression techniques.

Video compression techniques perform spatial (intra-picture) prediction and/or temporal (inter-picture) prediction to reduce or remove redundancy inherent in video sequences. For block-based video coding, a video slice (i.e., a video frame or a portion of a video frame) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

Spatial or temporal prediction results in a prediction block for a block to be coded. Residual data represents pixel differences between the original block to be coded and the prediction block. An inter-coded block is encoded according to a motion vector that points to a block of reference samples forming the prediction block, and the residual data indicating the difference between the coded block and the prediction block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

In general, this disclosure describes techniques for using adaptive parameter sets to code adaptive loop filter (ALF) parameters for block-based application of an ALF in a video coding process. In particular, this disclosure describes techniques where a number of adaptive parameter sets as well as the index for each of the number of adaptive parameter sets are signaled when ALF is enabled for one or more of a picture, a slice, tile, or a tile group. In some examples of the disclosure, the number and indices of adaptive parameter sets may be different for luma and chroma blocks of the picture, slice, tile, or tile group. In this way, ALF parameters may be signaled in a more flexible manner for different color components, and coding efficiency many be increased.

In one example, a method includes decoding, from a video bitstream for which adaptive loop filtering is enabled for luma blocks of one or more of a picture, a slice, a tile, or a tile group, a first syntax element indicating a number of adaptive parameter sets for the luma blocks of the one or more of the picture, the slice, the tile, or the tile group, decoding a plurality of first adaptive parameter set indices for the luma blocks of the one or more of the picture, the slice, the tile, or the tile group based on the number of adaptive parameter sets for the luma blocks of the one or more of the picture, the slice, the tile or the tile group, decoding, from the video bitstream for which adaptive loop filtering is enabled for chroma blocks of the one or more of the picture, the slice, the tile, or the tile group, a second adaptive parameter set index for the chroma blocks of the one or more of the picture, the slice, the tile, or the tile group, applying first adaptive loop filters to the luma blocks of the one or more of the picture, the slice, the tile, or the tile group based on the plurality of first adaptive parameter set indices, and applying a second adaptive loop filter to the chroma blocks of the one or more of the picture, the slice, the tile, or the tile group based on the second adaptive parameter set index.

In another example, a device includes a memory configured to store luma blocks of one or more of a picture, a slice, a tile, or a tile group and chroma blocks of the one or more of the picture, the slice, the tile, or the tile group, and one or more processors, implemented in circuitry and in communication with the memory, the one or more processors configured to decode, from a video bitstream for which adaptive loop filtering is enabled for the luma blocks of the one or more of the picture, the slice, the tile, or the tile group, a first syntax element indicating a number of adaptive parameter sets for the luma blocks of the one or more of the picture, the slice, the tile, or the tile group, decode a plurality of first adaptive parameter set indices for the luma blocks of the one or more of the picture, the slice, the tile, or the tile group based on the number of adaptive parameter sets for the luma blocks of the one or more of the picture, the slice, the tile, or the tile group, decode, from the video bitstream for which adaptive loop filtering is enabled for the chroma blocks of the one or more of the picture, the slice, the tile, or the tile group, a second adaptive parameter set index for the chroma blocks of the one or more of the picture, the slice, the tile, or the tile group, apply first adaptive loop filters to the luma blocks of the one or more of the picture, the slice, the tile, or the tile group based on the plurality of first adaptive parameter set indices, and apply a second adaptive loop filter to the chroma blocks of the one or more of the picture, the slice, the tile, or the tile group based on the second adaptive parameter set index.

In another example, a device includes means for decoding, from a video bitstream for which adaptive loop filtering is enabled for luma blocks of one or more of a picture, a slice, a tile, or a tile group, a first syntax element indicating a number of adaptive parameter sets for the luma blocks of the one or more of the picture, the slice, the tile, or the tile group, means for decoding a plurality of first adaptive parameter set indices for the luma blocks of the one or more of the picture, the slice, the tile, or the tile group based on the number of adaptive parameter sets for the luma blocks of the one or more of the picture, the slice, the tile, or the tile group, means for decoding, from the video bitstream for which adaptive loop filtering is enabled for chroma blocks of the one or more of the picture, the slice, the tile, or the tile group, a second adaptive parameter set index for the chroma blocks of the one or more of the picture, the slice, the tile, or the tile group, means for applying first adaptive loop filters to the luma blocks of the one or more of the picture, the slice, the tile, or the tile group based on the plurality of first adaptive parameter set indices, and means for applying a second adaptive loop filter to the chroma blocks of the one or more of the picture, the slice, the tile, or the tile group based on the second adaptive parameter set index.

In another example, a computer-readable storage medium is encoded with instructions that, when executed, cause a programmable processor to decode, from a video bitstream for which adaptive loop filtering is enabled for luma blocks of one or more of a picture, a slice, a tile, or a tile group, a first syntax element indicating a number of adaptive parameter sets for the luma blocks of the one or more of the picture, the slice, the tile, or the tile group, decode a plurality of first adaptive parameter set indices for the luma blocks of the one or more of the picture, the slice, the tile, or the tile group based on the number of adaptive parameter sets for the luma blocks of the one or more of the picture, the slice, the tile, or the tile group, decode, from the video bitstream for which adaptive loop filtering is enabled for chroma blocks of the one or more of the picture, the slice, the tile, or the tile group, a second adaptive parameter set index for the chroma blocks of the one or more of the picture, the slice, the tile, or the tile group, apply first adaptive loop filters to the luma blocks of the one or more of the picture, the slice, the tile, or the tile group based on the plurality of first adaptive parameter set indices, and apply a second adaptive loop filter to the chroma blocks of the one or more of the picture, the slice, the tile, or the tile group based on the second adaptive parameter set index.

In one example, a method includes encoding, for a video bitstream for which adaptive loop filtering is enabled for luma blocks of one or more of a picture, a slice, a tile, or a tile group, a first syntax element indicating a number of adaptive parameter sets for the luma blocks of the one or more of the picture, the slice, the tile, or the tile group, encoding a plurality of first adaptive parameter set indices for the luma blocks of the one or more of the picture, the slice, the tile, or the tile group based on the number of adaptive parameter sets for the luma blocks of the one or more of the picture, the slice, the tile, or the tile group, and encoding, for the video bitstream for which adaptive loop filtering is enabled for chroma blocks of the one or more of the picture, the slice, the tile, or the tile group, a second adaptive parameter set index for the chroma blocks of the one or more of the picture, the slice, the tile, or the tile group.

In another example, a device includes a memory configured to store luma blocks of one or more of a picture, a slice, a tile, or a tile group and chroma blocks of the one or more of the picture, the slice, the tile, or the tile group, and one or more processors, implemented in circuitry and in communication with the memory, the one or more processors configured to encode, for a video bitstream for which adaptive loop filtering is enabled for the luma blocks of the one or more of the picture, the slice, the tile, or the tile group, a first syntax element indicating a number of adaptive parameter sets for the luma blocks of the one or more of the picture, the slice, the tile, or the tile group, encode a plurality of first adaptive parameter set indices for the luma blocks of the one or more of the picture, the slice, the tile, or the tile group based on the number of adaptive parameter sets for the luma blocks of the one or more of the picture, the slice, the tile, or the tile group, and encode, for the video bitstream for which adaptive loop filtering is enabled for the chroma blocks of the one or more of the picture, the slice, the tile, or the tile group, a second adaptive parameter set index for the chroma blocks of the one or more of the picture, the slice, the tile, or the tile group.

In another example, a device includes means for encoding, for a video bitstream for which adaptive loop filtering is enabled for luma blocks of one or more of a picture, a slice, a tile, or a tile group, a first syntax element indicating a number of adaptive parameter sets for the luma blocks of the one or more of the picture, the slice, the tile, or the tile group, means for encoding a plurality of first adaptive parameter set indices for the luma blocks of the one or more of the picture, the slice, the tile, or the tile group based on the number of adaptive parameter sets for the luma blocks of the one or more of the picture, the slice, the tile, or the tile group, and means for encoding, for the video bitstream for which adaptive loop filtering is enabled for chroma blocks of the one or more of the picture, the slice, the tile, or the tile group, a second adaptive parameter set index for the chroma blocks of the one or more of the picture, the slice, the tile, or the tile group.

In another example, a computer-readable storage medium is encoded with instructions that, when executed, cause a programmable processor to encode, for a video bitstream for which adaptive loop filtering is enabled for luma blocks of one or more of a picture, a slice, a tile, or a tile group, a first syntax element indicating a number of adaptive parameter sets for the luma blocks of the one or more of the picture, the slice, the tile, or the tile group, encode a plurality of first adaptive parameter set indices for the luma blocks of the one or more of the picture, the slice, the tile, or the tile group based on the number of adaptive parameter sets for the luma blocks of the one or more of the picture, the slice, the tile, or the tile group, and encode, for the video bitstream for which adaptive loop filtering is enabled for chroma blocks of the one or more of the picture, the slice, the tile, or the tile group, a second adaptive parameter set index for the chroma blocks of the one or more of the picture, the slice, the tile, or the tile group.

The details of one or more examples are set forth in the accompanying drawings and the description below. Other features, objects, and advantages will be apparent from the description, drawings, and claims.

BRIEF DESCRIPTION OF DRAWINGS

FIGS. 3A-3D show four 1-D directional patterns for edge offset (EO) sample classification.

DETAILED DESCRIPTION

Figure 1:
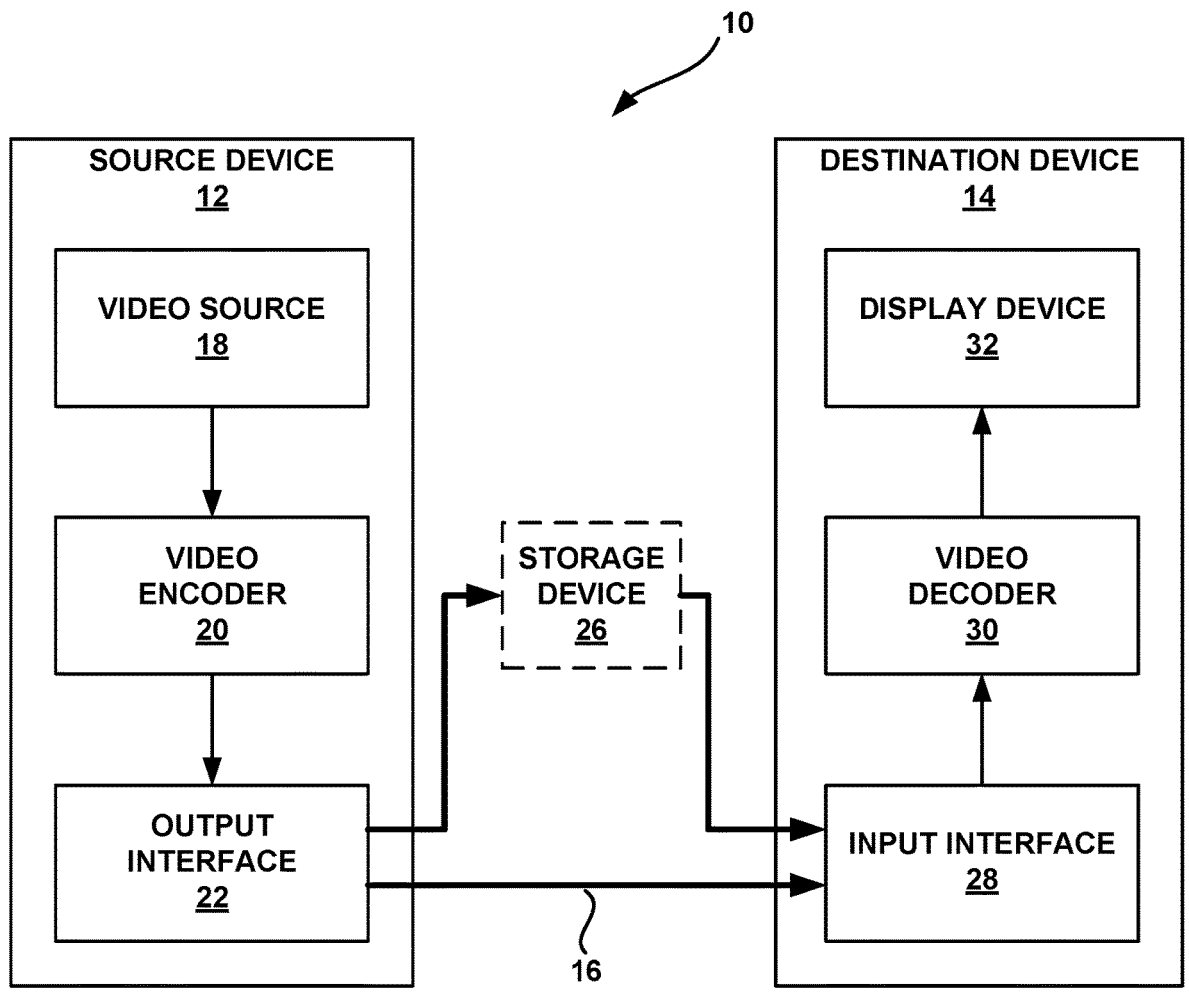
FIG. 1 is a block diagram illustrating an example video encoding and decoding system that may utilize the techniques described in this disclosure.

This disclosure describes techniques related to filtering operations which could be used in a post-processing stage, as part of in-loop coding, or in the prediction stage of video coding. The techniques of this disclosure may be implemented as an improvement or an extension to existing video codecs, such as the ITU-T H.265/HEVC (High Efficiency Video Coding) standard, and/or be an efficient coding tool for a future video coding standard, such as the ITU-T H.266/VVC (Versatile Video Coding) standard presently under development.

Video coding typically includes predicting a block of video data from either an already coded block of video data in the same picture (i.e., intra prediction) or an already coded block of video data in a different picture (i.e., inter prediction). In some examples, the video encoder also calculates residual data by comparing the prediction block to the original block. Thus, the residual data represents a difference between the prediction block and the original block. The video encoder may transform and quantize the residual data and signal the transformed and quantized residual data in the encoded bitstream.

A video decoder adds the residual data to the prediction block to produce a reconstructed video block that matches the original video block more closely than the prediction block alone. To further improve the quality of decoded video, a video decoder can perform one or more filtering operations on the reconstructed video blocks. Examples of these filtering operations include deblocking filtering, sample adaptive offset (SAO) filtering, and adaptive loop filtering (ALF). Parameters for these filtering operations may either be determined by a video encoder and explicitly signaled in the encoded video bitstream or may be implicitly determined by a video decoder without needing the parameters to be explicitly signaled in the encoded video bitstream.

This disclosure describes techniques related to filtering method(s) referred to as "Adaptive Loop Filter (ALF)." ALF may be used in a post-processing stage or for in-loop coding, or in a prediction process. SAO filtering and/or ALF may be used with various existing video codec technologies and extensions of such codecs, or be an efficient coding tool in any future video coding standards. HEVC and Joint Exploratory Model (JEM) of the Joint Video Exploration Team (JVET) techniques related to this disclosure are discussed below.

As used in this disclosure, the term video coding generically refers to either video encoding or video decoding. Similarly, the term video coder may generically refer to a video encoder or a video decoder. Moreover, certain techniques described in this disclosure with respect to video decoding may also apply to video encoding, and vice versa. For example, often times video encoders and video decoders are configured to perform the same process, or reciprocal processes. Also, a video encoder typically performs video decoding as part of the processes of determining how to encode video data.

FIG. 1 is a block diagram illustrating an example video encoding and decoding system 10 that may utilize the techniques described in this disclosure. As shown in FIG. 1, system 10 includes a source device 12 that generates encoded video data to be decoded at a later time by a destination device 14. Source device 12 and destination device 14 may be any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via a link 16. Link 16 may be any type of medium or device capable of moving the encoded video data from source device 12 to destination device 14. For example, encoded video data may be output from output interface 22 to link 16. In one example, link 16 may be a communication medium to enable source device 12 to transmit encoded video data directly to destination device 14 in real-time. The encoded video data may be modulated according to a communication standard, such as a wireless communication protocol, and transmitted to destination device 14. The communication medium may include any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In another example, encoded video data may be output from output interface 22 to a storage device 26. Similarly, encoded video data may be accessed from storage device 26 by input interface 28. Storage device 26 may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, storage device 26 may correspond to a file server or another intermediate storage device that may hold the encoded video generated by source device 12. Destination device 14 may access stored video data from storage device 26 via streaming or download. The file server may be any type of server capable of storing encoded video data and transmitting that encoded video data to the destination device 14. Example file servers include a web server (e.g., for a website), an FTP (File Transfer Protocol) server, network attached storage (NAS) devices, or a local disk drive. Destination device 14 may access the encoded video data through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on a file server. The transmission of encoded video data from storage device 26 may be a streaming transmission, a download transmission, or a combination of both.

The techniques of this disclosure are not necessarily limited to wireless applications or settings. The techniques may be applied to video coding in support of any of a variety of multimedia applications, such as over-the-air television broadcasts, cable television transmissions, satellite television transmissions, streaming video transmissions, e.g., via the Internet, encoding of digital video for storage on a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes a video source 18, a video encoder 20 and an output interface 22. In some cases, output interface 22 may include a modulator/demodulator (modem) and/or a transmitter. In source device 12, video source 18 may include a source such as a video capture device, e.g., a video camera, a video archive containing previously captured video, a video feed interface to receive video from a video content provider, and/or a computer graphics system for generating computer graphics data as the source video, or a combination of such sources. As one example, if video source 18 is a video camera, source device 12 and destination device 14 may form so-called camera phones or video phones. However, the techniques described in this disclosure may be applicable to video coding in general, and may be applied to wireless and/or wired applications.

The captured, pre-captured, or computer-generated video may be encoded by video encoder 20. The encoded video data may be transmitted directly to destination device 14 via output interface 22 of source device 12. The encoded video data may also (or alternatively) be stored onto storage device 26 for later access by destination device 14 or other devices, for decoding and/or playback.

Destination device 14 includes an input interface 28, a video decoder 30, and a display device 32. In some cases, input interface 28 may include a receiver and/or a modem. Input interface 28 of destination device 14 receives the encoded video data over link 16. The encoded video data communicated over link 16, or provided on storage device 26, may include a variety of syntax elements generated by video encoder 20 for use by a video decoder, such as video decoder 30, in decoding the video data. Such syntax elements may be included with the encoded video data transmitted on a communication medium, stored on a storage medium, or stored on a file server.

Display device 32 may be integrated with, or external to, destination device 14. In some examples, destination device 14 may include an integrated display device and also be configured to interface with an external display device. In other examples, destination device 14 may be a display device. In general, display device 32 displays the decoded video data to a user, and may be any of a variety of display devices such as a liquid crystal display (LCD), a plasma display, an organic light emitting diode (OLED) display, or another type of display device.

Video encoder 20 and video decoder 30 may operate according to a video compression standard, such as the High Efficiency Video Coding (HEVC) standard. Video encoder 20 and video decoder 30 may additionally operate according to an HEVC extension, such as the range extension, the multiview extension (MV-HEVC), or the scalable extension (SHVC) which have been developed by the Joint Collaboration Team on Video Coding (JCT-VC) as well as Joint Collaboration Team on 3D Video Coding Extension Development (JCT-3V) of ITU-T Video Coding Experts Group (VCEG) and ISO/IEC Motion Picture Experts Group (MPEG). Alternatively, video encoder 20 and video decoder 30 may operate according to other proprietary or industry standards, such as the ITU-T H.264 standard, alternatively referred to as ISO/IEC MPEG-4, Part 10, Advanced Video Coding (AVC), or extensions of such standards, such as the Scalable Video Coding (SVC) and Multi-view Video Coding (MVC) extensions. The techniques of this disclosure, however, are not limited to any particular coding standard. Other examples of video compression standards include ITU-T H.261, ISO/IEC MPEG-1 Visual, ITU-T H.262 or ISO/IEC MPEG-2 Visual, ITU-T H.263, and ISO/IEC MPEG-4 Visual. HEVC (ITU-T H.265), including its range extension, multiview extension (MV-HEVC) and scalable extension (SHVC), were developed by the Joint Collaboration Team on Video Coding (JCT-VC) as well as the Joint Collaboration Team on 3D Video Coding Extension Development (JCT-3V) of ITU-T Video Coding Experts Group (VCEG) and ISO/IEC Motion Picture Experts Group (MPEG). The finalized HEVC draft, referred to as HEVC hereinafter, is available at http://phenix.int-evry.fr/jct/doc_end_user/documents/14_Vienna/wg11/JCTVC-N1003-v1.zip.

ITU-T VCEG (Q6/16) and ISO/IEC MPEG (JTC 1/SC 29/WG 11) are now studying the potential need for standardization of future video coding technology with a compression capability that potentially exceeds that of the current HEVC standard (including its current extensions and near-term extensions for screen content coding and high-dynamic-range coding). The groups are working together on this exploration activity in a joint collaboration effort known as the Joint Video Exploration Team (JVET) to evaluate compression technology designs proposed by their experts in this area. The JVET first met during 19-21 Oct. 2015. The latest version of the reference software, i.e., Joint Exploration Model 7 (JEM 7), can be downloaded from: https://jvet.hhi.fraunhofer.de/svn/svn_HMJEMSoftware/tags/HM-16.6-JEM-7.0/. The algorithm description for JEM7 is described in J. Chen, E. Alshina, G. J. Sullivan, J.-R. Ohm, J. Boyce, "Algorithm description of Joint Exploration Test Model 7 (JEM7)," JVET-G1001, Torino, July 2017.

In examples of the disclosure described below, video encoder 20 and video decoder 30 may operate according to one or more versions of the developing ITU-T H.266 standard, also referred to as Versatile Video Coding (VVC). A draft of the VVC standard is described in Bross, et al. "Versatile Video Coding (Draft 7)," Joint Video Experts Team (JVET) of ITU-T SG 16 WP 3 and ISO/IEC JTC 1/SC 29/WG 11, 16$^{th}$ Meeting: Geneva, CH, 1-11 October 2019, JVET-P2001-v14 (hereinafter "VVC Draft 7"). The techniques of this disclosure, however, are not limited to any particular coding standard.

Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

Video encoder 20 and video decoder 30 each may be implemented as any of a variety of suitable encoder circuitry or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

As will be explained in more detail below, video encoder 20 may be configured to encode, for a video bitstream for which adaptive loop filtering is enabled for luma blocks of one or more of a picture, a slice, a tile, or a tile group, a first syntax element indicating a number of adaptive parameter sets for the luma blocks of the one or more of the picture, the slice, the tile, or the tile group, encode a plurality of first adaptive parameter set indices for the luma blocks of the one or more of the picture, the slice, the tile, or the tile group based on the number of adaptive parameter sets for the luma blocks of the one or more of the picture, the slice, the tile, or the tile group, and encode, for the video bitstream for which adaptive loop filtering is enabled for the chroma blocks of the one or more of the picture, the slice, the tile, or the tile group, a second adaptive parameter set index for the chroma blocks of the one or more of the picture, the slice, the tile, or the tile group.

In a reciprocal fashion, video decoder 30 may be configured to decode, from a video bitstream for which adaptive loop filtering is enabled for luma blocks of one or more of a picture, a slice, a tile, or a tile group, a first syntax element indicating a number of adaptive parameter sets for the luma blocks of the one or more of the picture, the slice, the tile, or the tile group, decode a plurality of first adaptive parameter set indices for the luma blocks of the one or more of the picture, the slice, the tile, or the tile group based on the number of adaptive parameter sets for the luma blocks of the one or more of the picture, the slice, the tile, or the tile group, decode, from the video bitstream for which adaptive loop filtering is enabled for chroma blocks of the one or more of the picture, the slice, the tile, or the tile group, a second adaptive parameter set index for the chroma blocks of the one or more of the picture, the slice, the tile, or the tile group, apply first adaptive loop filters to the luma blocks of the one or more of the picture, the slice, the tile, or the tile group based on the plurality of first adaptive parameter set indices, and apply a second adaptive loop filter to the chroma blocks of the one or more of the picture, the slice, the tile, or the tile group based on the second adaptive parameter set index.

In HEVC, VVC, and other video coding specifications, a video sequence typically includes a series of pictures. Pictures may also be referred to as "frames." In one example approach, a picture may include three sample arrays, denoted $S_L$, $S_{Cb}$, and $S_{Cr}$. In such an example approach, $S_L$ is a two-dimensional array (i.e., a block) of luma samples. $S_{Cb}$ is a two-dimensional array of Cb chrominance samples. $S_{Cr}$ is a two-dimensional array of Cr chrominance samples. Chrominance samples may also be referred to herein as "chroma" samples. In other instances, a picture may be monochrome and may only include an array of luma samples.

To generate an encoded representation of a picture, video encoder 20 may generate a set of coding tree units (CTUs). Each of the CTUs may include a coding tree block of luma samples, two corresponding coding tree blocks of chroma samples, and syntax structures used to code the samples of the coding tree blocks. In monochrome pictures or pictures having three separate color planes, a CTU may include a single coding tree block and syntax structures used to code the samples of the coding tree block. A coding tree block may be an N×N block of samples. A CTU may also be referred to as a "tree block" or a "largest coding unit" (LCU). The CTUs of HEVC may be broadly analogous to the macroblocks of other standards, such as H.264/AVC. However, a CTU is not necessarily limited to a particular size and may include one or more coding units (CUs). A slice may include an integer number of CTUs ordered consecutively in a raster scan order.

To generate a coded CTU, video encoder 20 may recursively perform quad-tree partitioning on the coding tree blocks of a CTU to divide the coding tree blocks into coding blocks, hence the name "coding tree units." A coding block may be an N×N block of samples. A CU may include a coding block of luma samples and two corresponding coding blocks of chroma samples of a picture that has a luma sample array, a Cb sample array, and a Cr sample array, and syntax structures used to code the samples of the coding blocks. In monochrome pictures or pictures having three separate color planes, a CU may include a single coding block and syntax structures used to code the samples of the coding block.

Video encoder 20 may partition a coding block of a CU into one or more prediction blocks. A prediction block is a rectangular (i.e., square or non-square) block of samples on which the same prediction is applied. A prediction unit (PU) of a CU may include a prediction block of luma samples, two corresponding prediction blocks of chroma samples, and syntax structures used to predict the prediction blocks. In monochrome pictures or pictures having three separate color planes, a PU may include a single prediction block and syntax structures used to predict the prediction block. Video encoder 20 may generate predictive luma, Cb, and Cr blocks for luma, Cb, and Cr prediction blocks of each PU of the CU.

Video encoder 20 may use intra prediction or inter prediction to generate the prediction blocks for a PU. If video encoder 20 uses intra prediction to generate the prediction blocks of a PU, video encoder 20 may generate the prediction blocks of the PU based on decoded samples of the picture associated with the PU. If video encoder 20 uses inter prediction to generate the prediction blocks of a PU, video encoder 20 may generate the prediction blocks of the PU based on decoded samples of one or more pictures other than the picture associated with the PU.

After video encoder 20 generates predictive luma, Cb, and Cr blocks for one or more PUs of a CU, video encoder 20 may generate a luma residual block for the CU. Each sample in the CU's luma residual block indicates a difference between a luma sample in one of the CU's predictive luma blocks and a corresponding sample in the CU's original luma coding block. In addition, video encoder 20 may generate a Cb residual block for the CU. Each sample in the CU's Cb residual block may indicate a difference between a Cb sample in one of the CU's predictive Cb blocks and a corresponding sample in the CU's original Cb coding block. Video encoder 20 may also generate a Cr residual block for the CU. Each sample in the CU's Cr residual block may indicate a difference between a Cr sample in one of the CU's predictive Cr blocks and a corresponding sample in the CU's original Cr coding block.

Furthermore, video encoder 20 may use quad-tree partitioning to decompose the luma, Cb, and Cr residual blocks of a CU into one or more luma, Cb, and Cr transform blocks.

A transform block is a rectangular (e.g., square or non-square) block of samples on which the same transform is applied. A transform unit (TU) of a CU may include a transform block of luma samples, two corresponding transform blocks of chroma samples, and syntax structures used to transform the transform block samples. Thus, each TU of a CU may be associated with a luma transform block, a Cb transform block, and a Cr transform block. The luma transform block associated with the TU may be a sub-block of the CU's luma residual block. The Cb transform block may be a sub-block of the CU's Cb residual block. The Cr transform block may be a sub-block of the CU's Cr residual block. In monochrome pictures or pictures having three separate color planes, a TU may include a single transform block and syntax structures used to transform the samples of the transform block.

Video encoder 20 may apply one or more transforms to a luma transform block of a TU to generate a luma coefficient block for the TU. A coefficient block may be a two-dimensional array of transform coefficients. A transform coefficient may be a scalar quantity. Video encoder 20 may apply one or more transforms to a Cb transform block of a TU to generate a Cb coefficient block for the TU. Video encoder 20 may apply one or more transforms to a Cr transform block of a TU to generate a Cr coefficient block for the TU.

The above block structure with CTUs, CUs, PUs, and TUs generally describes the block structure used in HEVC. Other video coding standards, however, may use different block structures. As one example, although HEVC allows PUs and TUs to have different sizes or shapes, other video coding standards may require prediction blocks and transform blocks to have a same size. The techniques of this disclosure are not limited to the block structure of HEVC or VVC and may be compatible with other block structures.

After generating a coefficient block (e.g., a luma coefficient block, a Cb coefficient block or a Cr coefficient block), video encoder 20 may quantize the coefficient block. Quantization generally refers to a process in which transform coefficients are quantized to possibly reduce the amount of data used to represent the transform coefficients, providing further compression. After video encoder 20 quantizes a coefficient block, video encoder 20 may entropy encode syntax elements indicating the quantized transform coefficients. For example, video encoder 20 may perform Context-Adaptive Binary Arithmetic Coding (CABAC) on the syntax elements indicating the quantized transform coefficients.

Video encoder 20 may output a bitstream that includes a sequence of bits that forms a representation of coded pictures and associated data. The bitstream may include a sequence of Network Abstraction Layer (NAL) units. A NAL unit is a syntax structure containing an indication of the type of data in the NAL unit and bytes containing that data in the form of a raw byte sequence payload (RBSP) interspersed as necessary with emulation prevention bits. Each of the NAL units includes a NAL unit header and encapsulates a RBSP. The NAL unit header may include a syntax element that indicates a NAL unit type code. The NAL unit type code specified by the NAL unit header of a NAL unit indicates the type of the NAL unit. A RBSP may be a syntax structure containing an integer number of bytes that is encapsulated within a NAL unit. In some instances, an RBSP includes zero bits.

Different types of NAL units may encapsulate different types of RBSPs. For example, a first type of NAL unit may encapsulate an RBSP for a picture parameter set (PPS), a second type of NAL unit may encapsulate an RBSP for a coded slice, a third type of NAL unit may encapsulate an RBSP for supplemental enhancement information (SEI) messages, and so on. NAL units that encapsulate RBSPs for video coding data (as opposed to RBSPs for parameter sets and SEI messages) may be referred to as video coding layer (VCL) NAL units.

Video decoder 30 may receive a bitstream generated by video encoder 20. In addition, video decoder 30 may parse the bitstream to obtain syntax elements from the bitstream. Video decoder 30 may reconstruct the pictures of the video data based at least in part on the syntax elements obtained from the bitstream. The process to reconstruct the video data may be generally reciprocal to the process performed by video encoder 20. In addition, video decoder 30 may inverse quantize coefficient blocks associated with TUs of a current CU. Video decoder 30 may perform inverse transforms on the coefficient blocks to reconstruct transform blocks associated with the TUs of the current CU. Video decoder 30 may reconstruct the coding blocks of the current CU by adding the samples of the prediction blocks for PUs of the current CU to corresponding samples of the transform blocks of the TUs of the current CU. By reconstructing the coding blocks for each CU of a picture, video decoder 30 may reconstruct the picture.

Figure 2:
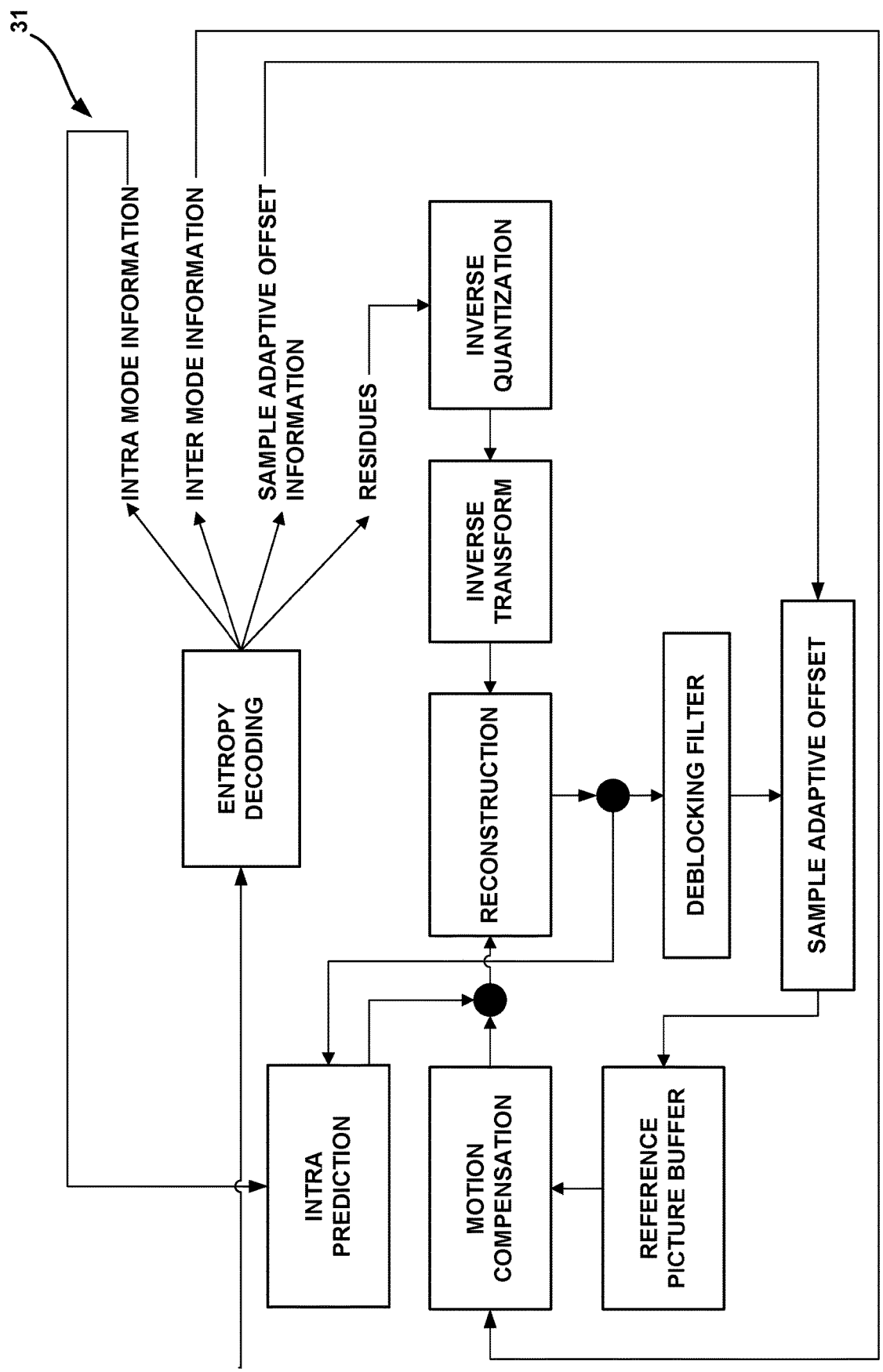
FIG. 2 shows an example block diagram of an HEVC decoder.

Aspects of HEVC, VVC, and JEM techniques will now be discussed. FIG. 2 shows an example block diagram of an HEVC decoder 31. The video decoder 31 shown in FIG. 2 may correspond to video decoder 30 described above, which will be described in more detail below. HEVC employs two in-loop filters including de-blocking filter (DBF) and SAO. Additional details regarding HEVC decoding and SAO are described in C. Fu, E. Alshina, A. Alshin, Y. Huang, C. Chen, Chia. Tsai, C. Hsu, S. Lei, J. Park, W. Han, "Sample adaptive offset in the HEVC standard," IEEE Trans. Circuits Syst. Video Technol., 22(12): 1755-1764 (2012).

As illustrated in FIG. 2, the input to a DBF may be the reconstructed image after intra or inter prediction, as shown with the output from the reconstruction block. The DBF performs detection of the artifacts at the coded block boundaries and attenuates the artifacts by applying a selected filter. Compared to the H.264/AVC deblocking filter, the HEVC deblocking filter has lower computational complexity and better parallel processing capabilities while still achieving significant reduction of the visual artifacts. For additional examples, see A. Norkin, G. Bjontegaard, A. Fuldseth, M. Narroschke, M. Ikeda, K. Andersson, Minhua Zhou, G. Van der Auwera, "HEVC Deblocking Filter," IEEE Trans. Circuits Syst. Video Technol., 22(12): 1746-1754 (2012).

In HEVC, the deblocking filter decisions are made separately for each boundary of a four-sample length that lies on the grid dividing the picture into blocks of 8×8 samples. Deblocking is performed on a block boundary if the following conditions are true: (1) the block boundary is a prediction unit (PU) or transform unit (TU) boundary; (2) the boundary strength (Bs), as defined in Table 1 below, is greater than zero; and (3) variation of signal, as defined in Equation (1) below, on both sides of a block boundary is below a specified threshold.

TABLE 1

Boundary strength (Bs) values for boundaries
between two neighboring luma blocks

| Conditions | Bs |
|---|---|
| At least one of the blocks is Intra coded | 2 |
| At least one of the blocks has non-zero coded residual coefficient and boundary is a transform boundary | 1 |
| Absolute differences between corresponding spatial motion vector components of the two blocks are >= 1 in units of integer pixels | 1 |
| Motion-compensated prediction for the two blocks refers to different reference pictures or the number of motion vectors is different for the two blocks | 1 |
| Otherwise | 0 |

If Bs>0 for a luma block boundary, then the deblocking filtering is applied to that boundary if the following condition holds:

$$|p_{2,0}-2p_{1,0}+p_{0,0}|+|p_{2,3}-2p_{1,3}+p_{0,3}|+|q_{2,0}-2q_{1,0}+q_{0,0}|+|q_{2,3}-2q_{1,3}+q_{0,3}|<\beta \quad (1)$$

HEVC allows for two types of luma deblocking filters, namely: (i) normal filter, and (ii) strong filter. The choice of deblocking filter depends on whether particular signal variation terms are less than certain thresholds (see "HEVC Deblocking Filter" by Norkin et al (2012) cited above for details). Although the filtering decisions are based only on the two rows (columns) of a four pixel long vertical (or horizontal, as the case may be) boundary, the filter is applied to every row (or column, as the case may be) in the boundary. The number of pixels used in the filtering process and the number of pixels that may be modified with each type of filtering is summarized in Table 2 below.

TABLE 2

Number of pixels used/modified
per boundary in HEVC deblocking

| | Pixels used (on either side of boundary) | Pixels modified (on either side of boundary) |
|---|---|---|
| Normal filter | 3 or 2 | 2 or 1 |
| Strong filter | 4 | 3 |

Chroma deblocking is performed only when Bs equals two (2). Only one type of chroma deblocking filter is used. The chroma deblocking filter uses pixels $p_0$, $p_1$, $q_0$, $q_1$ and may modify pixels $p_0$ and $q_0$ in each row (the second subscript indicating the row index is omitted in the above description for brevity, because the filter is applied to every row). In JEM, deblocking is performed at CU level. The size of CUs on either side of a boundary can be larger than 8×8. The minimum CU size in JEM is 4×4. Therefore, deblocking filter may also be applied to boundaries of 4×4 blocks.

The input to SAO may be the reconstructed image after applying the deblocking filter, as shown with the output from the deblocking filter in FIG. 2. The concept/idea of SAO is to reduce mean sample distortion of a region by first classifying the region samples into multiple categories with a selected classifier, obtaining an offset for each category, and then adding the offset to each sample of the category, where the classifier index and the offsets of the region are coded in the bitstream. In HEVC, the region (the unit for SAO parameters signaling) is defined to be a CTU.

Two SAO types that can satisfy the requirement(s) of low complexity are adopted in HEVC. Those two types are edge offset (EO) and band offset (BO), which are discussed in further detail below. An index of an SAO type is coded. For EO, the sample classification is based on comparison between current samples and neighboring samples according to the following 1-D directional patterns: horizontal, vertical, 135° diagonal, and 45° diagonal.

Figures 3A, 3B, 3C, 3D:
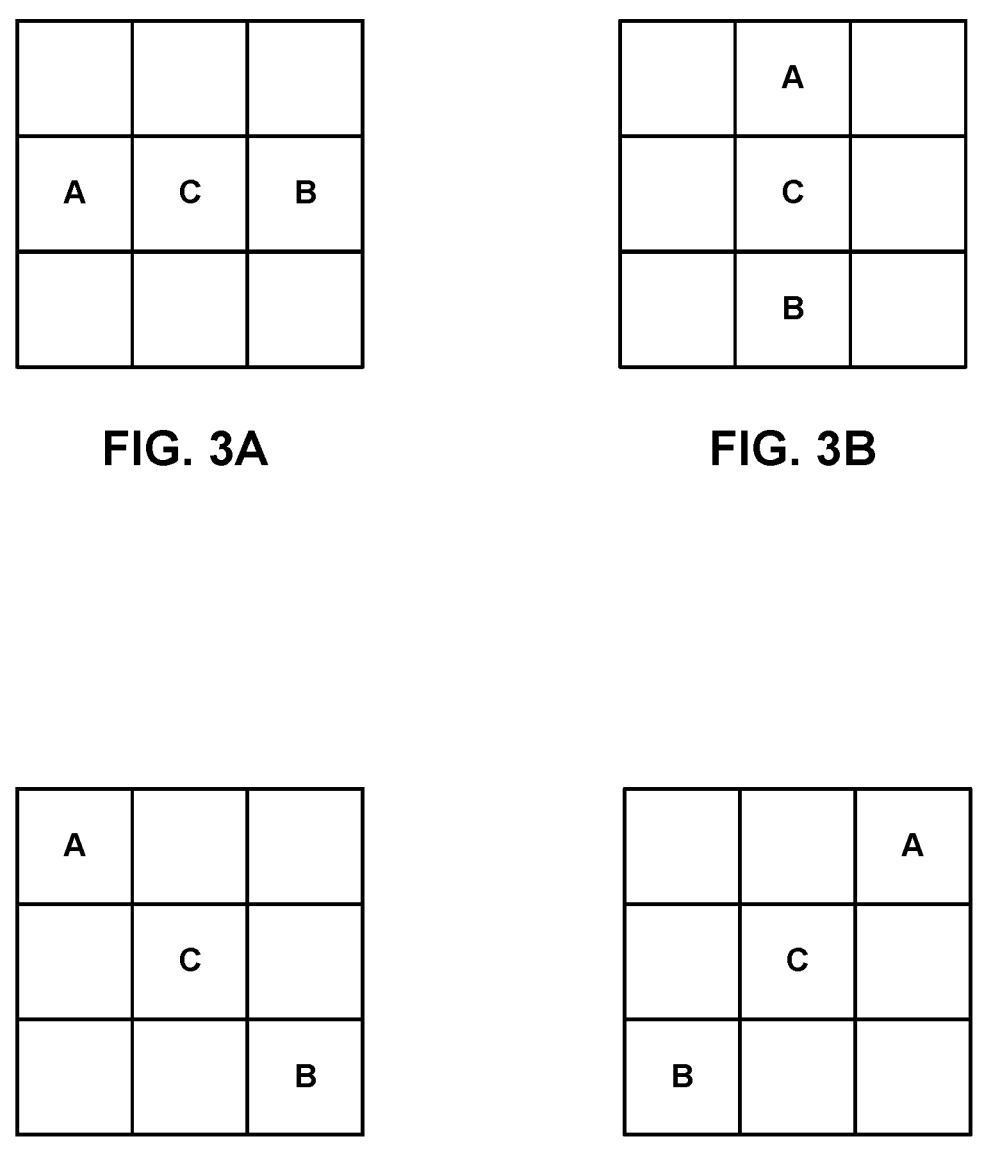

FIGS. 3A-3D show four 1-D directional patterns for EO sample classification: horizontal (FIG. 3A, EO class=0), vertical (FIG. 3B, EO class=1), 135° diagonal (FIG. 3C, EO class=2), and 45° diagonal (FIG. 3D, EO class=3). Additional details related to SAO are described in C. Fu, E. Alshina, A. Alshin, Y. Huang, C. Chen, Chia. Tsai, C. Hsu, S. Lei, J. Park, W. Han, "Sample adaptive offset in the HEVC standard," IEEE Trans. Circuits Syst. Video Technol., 22(12): 1755-1764 (2012).

According to the selected EO pattern, five categories denoted by edgeIdx in Table 3 are further defined. For edgeIdx equal to 0~3, the magnitude of an offset may be signaled while the sign flag is implicitly coded, i.e., negative offset for edgeIdx equal to 0 or 1 and positive offset for edgeIdx equal to 2 or 3. For edgeIdx equal to 4, the offset is always set to 0 which means no operation is required for this case.

TABLE 3 classification for EO

| Category (edgeIdx) | Condition |
|---|---|
| 0 | c < a && c < b |
| 1 | (c < a && c == b) \|\| (c == a && c < b) |
| 2 | (c > a && c == b) \|\| (c == a && c > b) |
| 3 | c > a && c > b |
| 4 | None of the above |

For BO, the sample classification is based on sample values. Each color component may have its own SAO parameters for classification for BO type SAO filtering. BO implies that one offset is added to all samples of the same band. The sample value range is equally divided into 32 bands. For 8-bit samples ranging from 0 to 255, the width of a band is 8, and sample values from 8k to 8k+7 belong to band k, where k ranges from 0 to 31. One offset is added to all samples of the same band. The average difference between the original samples and reconstructed samples in a band (i.e., offset of a band) is signaled to the decoder (e.g., video decoder 30). There is no constraint on offset signs. Only offsets of four (4) consecutive bands and the starting band position are signaled to the decoder (e.g., video decoder 30).

Video encoder 20 and video decoder 30 may be configured to implement various ALF filtering techniques set forth in JEM. Aspects of these JEM filtering techniques (e.g., ALF) will now be described. In addition to the modified de-blocking and HEVC SAO methods, JEM includes another filtering method, called Geometry transformation-based Adaptive Loop Filtering (GALF). The input to an ALF/GALF may be the reconstructed image after the application of SAO (e.g., output of sample adaptive offset in FIG. 2). Aspects of GALF are described in Tsai, C. Y., Chen, C. Y., Yamakage, T., Chong, I. S., Huang, Y. W., Fu, C. M., Itoh, T., Watanabe, T., Chujoh, T., Karczewicz, M. and Lei, S. M., "Adaptive loop filtering for video coding," IEEE Journal of Selected Topics in Signal Processing, 7(6), pp. 934-945, 2013 and in M. Karczewicz, L. Zhang, W.-J. Chien, and X. Li, "Geometry transformation-based adaptive in-loop filter," Picture Coding Symposium (PCS), 2016.

ALF techniques attempt to minimize the mean square error between original samples and decoded samples by using an adaptive Wiener filter. Denote the input image as p, the source image as S, and the FIR (finite impulse response) filter as h. Then, the following expression of the sum of squared errors (SSE) should be minimized, where (x,y) denotes any pixel position in p or S.

$$SSE = \Sigma_{x,y}(\Sigma_{i,j}h(i,j)p(x-i,y-j)-S(x,y))^2$$

The optimal h, denoted as $h_{opt}$, can be obtained by setting the partial derivative of SSE with respect to h(i,j) equal to 0 as follows:

$$\frac{\partial SSE}{\partial h(i,j)} = 0$$

This leads to the Wiener-Hopf equation shown below, which gives the optimal filter $h_{opt}$:

$$\Sigma_{i,j}h_{opt}(i,j)(\Sigma_{x,y}p(x-i,y-j)p(x-m,y-n)) = \Sigma_{x,y}S(x,y)p(x-m,y-n)$$

In some examples of JEM, instead of using one filter for the whole picture, samples in a picture are classified into twenty-five (25) classes, based on the local gradients. Separate optimal Wiener filters are derived for the pixels in each class. Several techniques have been employed to increase the effectiveness of an ALF by reducing signaling overhead and computational complexity. Some of the techniques that have been used to increase ALF effectiveness by reducing signaling overhead and/or computational complexity are listed below:

1. Prediction from fixed filters: Optimal filter coefficients for each class are predicted using a prediction pool of fixed filters which consists of 16 candidate filters for each class. The best prediction candidate is selected for each class and only the prediction errors are transmitted.
2. Class merging: Instead of using twenty five (25) different filters (one for each class), pixels in multiple classes can share one filter in order to reduce the number of filter parameters to be coded. Merging two classes can lead to higher cumulative SSE but lower Rate-Distortion (R-D) cost.
3. Variable number of taps: The number of filter taps is adaptive at the frame level. Theoretically, filters with more taps can achieve lower SSE, but may not be a good choice in terms of Rate-Distortion (R-D) cost, because of the bit overhead associated with more filter coefficients.
4. Block level on/off control: An ALF can be turned on and off on a block basis. The block size at which the on/off control flag is signaled is adaptively selected at the frame level. Filter coefficients may be recomputed using pixels from only those blocks for which is an ALF is on.
5. Temporal prediction: Filters derived for previously coded frames are stored in a buffer. If the current frame is a P or B frame, then one of the stored set of filters may be used to filter this frame if it leads to better RD cost. A flag is signaled to indicate usage of temporal prediction. If temporal prediction is used, then an index indicating which set of stored filters is used is signaled. No additional signaling of ALF coefficients is needed. Block level ALF on/off control flags may be also signaled for a frame using temporal prediction.

Details of some aspects of ALF are summarized briefly in this and the following paragraphs. Some aspects of ALF are related to pixel classification and geometry transformation. Sums of absolute values of vertical, horizontal and diagonal Laplacians at all pixels within a 6×6 window that covers each pixel in a reconstructed frame (before an ALF) are computed. The reconstructed frame is then divided into non-overlapped 2×2 blocks. The four pixels in these blocks are classified into one of twenty five (25) categories, denoted as $C_k$ (k=0, 1, . . . , 24), based on the total Laplacian activity and directionality of that block. Additionally, one of four geometry transformations (no transformation, diagonal flip, vertical flip or rotation) is also applied to the filters based on the gradient directionality of that block. The details can be found in M. Karczewicz, L. Zhang, W.-J. Chien, and X. Li, "Geometry transformation-based adaptive in-loop filter," Picture Coding Symposium (PCS), 2016.

Some aspects of ALF are related to filter derivation and prediction from fixed filters. For each class $C_k$, a best prediction filter is first selected from the pool for $C_k$, denoted as $h_{pred,k}$, based on the SSE given by the filters. The SSE of $C_k$, which is to be minimized, can be written as below, $$SSE_k = \Sigma_{x,y}(\Sigma_{i,j}(h_{pred,k}(i,j)+h_{\Delta,k}(i,j))p(x-i,y-j)-S(x,y))^2, k=0, \ldots, 24, (x,y) \in C_k,$$

where $h_{\Delta,k}$ is the difference between the optimal filter for $C_k$ and $h_{pred,k}$. Let $p'(x,y) = \Sigma_{i,j}h_{pred,k}(i,j)p(x-i,y-j)$ be the result of filtering pixel p(x,y) by $h_{pred,k}$. Then the expression for $SSE_k$ can be re-written as:

$$SSE_k = \sum_{x,y}\left(\sum_{i,j} h_{\Delta,k}(i,j)p(x-i, y-j) - (S(x,y) - p'(x,y))\right)^2$$

$$k = 0, \ldots, 24, (x, y) \in C_k$$

By making the partial derivative of $SSE_k$ with respect to $h_{\Delta,k}$(i,j) equal to 0, the modified Wiener-Hopf equation is obtained as follows:

$$\sum_{i,j} h_{\Delta,k}(i,j)\left(\sum_{x,y} p(x-i, y-j)p(x-m, y-n)\right) = \sum_{x,y}(S(x,y) - p'(x,y))p(x-m, y-n)$$

$$k = 0, 24, (x, y) \in C_k$$

For the simplicity of expression, denote $\Sigma_{x,y}p(x-i,y-j)p(x-m,y-n)$ and $\Sigma_{x,y}(S(x,y)-p'(x,y))p(x-m,y-n)$ with $(x,y) \in C_k$ by $R_{pp,k}(i-m,j-n)$ and $R'_{ps,k}(m,n)$, respectively. Then, the above equation can be written as:

$$\Sigma_{i,j}h_{\Delta,k}(i,j)R_{pp,k}(i-m,j-n) = R'_{ps,k}(m,n) \quad k=0, \ldots, 24 \quad (1)$$

For every $C_k$, the auto-correlation matrix $R_{pp,k}$(i−m,j−n) and cross-correlation vector $R'_{ps,k}$(m,n) are computed over all $(x,y) \in C_k$.

In one example of an ALF, only the difference between the optimal filter and the fixed prediction filter is calculated and transmitted. If none of the candidate filters available in the pool is a good predictor, then the identity filter (i.e., the filter with only one non-zero coefficient equal to 1 at the center that makes the input and output identical) will be used as the predictor.

Some aspects of an ALF relate to the merging of pixel classes. Classes are merged to reduce the overhead of signaling filter coefficients. The cost of merging two classes is increased with respect to SSE. Consider two classes $C_m$ and $C_n$ with SSEs given by $SSE_m$ and $SSE_n$, respectively. Let $C_{m+n}$ denote the class obtained by merging $C_m$ and $C_n$ with SSE, denoted as $SSE_{m+n}$. $SSE_{m+n}$ is always greater than or equal to $SSE_m+SSE_n$. Let $\Delta SSE_{m+n}$ denote the increase in SSE caused by merging $C_m$ and $C_n$, which is equal to $SSE_{m+n}-(SSE_m+SSE_n)$. To calculate $SSE_{m+n}$, one needs to derive $h_{\Delta,m+n}$, the filter prediction error for $C_{m+n}$, using the following expression similar to (1):

$$\Sigma_{i,j} h_{\Delta,m+n}(i,j)(R_{pp,m}(i-u,j-v)+R_{pp,n}(i-u,j-v)) = R'_{ps,m}(u,v)+R'_{ps,n}(u,v) \qquad (2)$$

The SSE for the merged category $C_{m+n}$ can then be calculated as:

$$SSE_{m+n}=-\Sigma_{u,v} h_{\Delta,m+n}(u,v)(R'_{ps,m}(u,v)+R'_{ps,n}(u,v))+(R_{ss,m}+R_{ss,n})$$

To reduce the number of classes from N to N−1, two classes $C_m$ and $C_n$ may need to be found, such that merging them leads to the smallest $\Delta SSE_{m+n}$ compared to any other combinations. Some ALF designs check every pair of available classes for merging to find the pair with the smallest merge cost.

If $C_m$ and $C_n$ (with m<n) are merged, then $C_n$ is marked unavailable for further merging and the auto- and cross-correlations for $C_m$ are changed to the combined auto- and cross-correlations as follows:

$$R_{pp,m}=R_{pp,m}+R_{pp,n}$$

$$R'_{ps,m}=R'_{ps,m}+R'_{ps,n}$$

$$R_{ss,m}=R_{ss,m}+R_{ss,n}.$$

An optimal number of ALF classes after merging needs to be decided for each frame based on the RD cost. This is done by starting with twenty-five (25) classes and merging a pair of classes (from the set of available classes) successively until there is only one class left. For each possible number of classes (1, 2, . . . , 25) left after merging, a map indicating which classes are merged together is stored. The optimal number of classes is then selected such that the RD cost is minimized as follows:

$$N_{opt} = \underset{N}{\operatorname{argmin}}(J|_N = D|_N + \lambda R|_N),$$

where $D|_N$ is the total SSE of using N classes ($D|_N = \Sigma_{k=0}^{N-1} SSE_k$), $R|_N$ is the total number of bits used to code the N filters, and $\lambda$ is the weighting factor determined by the quantization parameter (QP). The merge map for $N_{opt}$ number of classes, indicating which classes are merged together, is transmitted.

Aspects of the signaling of ALF parameters are now described. A brief step-by-step description of the ALF parameter encoding process is given below:
1. Signal the frame level ALF on/off flag.
2. If ALF is on, then signal the temporal prediction flag.
3. If temporal prediction is used, then signal the index of the frame from which the corresponding ALF parameters are used for filtering the current frame.
4. If temporal prediction is not used, then signal the auxiliary ALF information and filter coefficients as follows:
    a. The following auxiliary ALF information is signaled before signaling the filter coefficients.
        i. The number of unique filters used after class merging.
        ii. Number of filter taps.
        iii. Class merge information indicating which classes share the filter prediction errors.
        iv. Index of the fixed filter predictor for each class.
    b. After signaling the auxiliary information, filter coefficient prediction errors are signaled as follows:
        i. A flag is signaled to indicate if the filter prediction errors are forced to zero (0) for some of the remaining classes after merging.
        ii. A flag is signaled to indicate if differential coding is used for signaling filter prediction errors (if the number of classes left after merging is larger than one (1)).
        iii. Filter coefficient prediction errors are then signaled using k-th order Exp-Golomb code, where the k-value for different coefficient positions is selected empirically.
    c. Filter coefficients for chroma components, if available, are directly coded without any prediction methods.
5. Finally, the block-level ALF on/off control flags are signaled.

ALF filter parameters are signalled in APSs in VVC. In an ALF APS in VVC, the signalling may include the following:
1. Signal if an ALF APS contains luma ALF filters
2. If an ALF APS containing luma ALF filters
    a. Signal The number of unique luma filters used after class merging
    b. Signal class merge information indicating which classes share the same filter
    c. Signal a flag if clipping is applied to luma ALF filters
    d. After a-c, signal filter coefficients, and if clipping is applied to luma ALF filters, clipping parameters are signalled
3. Signal if the ALF APS contains chroma ALF filters.
    a. Signal the number of unique chroma filters
    b. Signal a flag if clipping is applied to chroma ALF filters
    c. After a-b, signal filter coefficients, and if clipping is applied to luma ALF filters, clipping parameters are signalled ALF APS indices used in a picture or are signaled in a picture and/or slice header in VVC.
Luma:
1. Signal picture/slice level luma ALF on/off flag
2. If ALF is on for luma, signal the number of APSs applied to luma component of current picture/slice.
3. If the number of APSs is larger than 0, signal each APS index applied to the luma component of current picture/slice.
Chroma:
1. Signal picture/slice level chroma ALF on/off information
2. If ALF is on for any chroma component, signal the APS index applied to the chroma component of current picture/slice.
3. If ALF is on for a chroma CTB, a filter index is signalled.

Coding tree block (CTB) level on/off flag and filter index information is also signalled.
Luma:
Signal an ALF on/off flag for a luma CTB.
If ALF is on for a luma CTB, a fixed filter set index or an APS index is signalled.

Chroma:

Signal an ALF on/off flag for a chroma CTB.

The design of ALF in some examples of JEM may present one or more potential problems. As one example, some example ALF designs perform multiple passes over each frame to design one set of filters (one for each class of pixels or one filter shared among multiple classes in the frame) for the whole frame. This introduces high encoder latency. This is especially problematic in low delay applications, such as video conferencing, where it may be important to send even a partly encoded frame to the channel as soon as possible.

As another example, according to some ALF designs, one set of filters is used for the whole picture. The local statistics in a small block of the original and reconstructed picture may be different than the cumulative statistics obtained using the whole picture. Therefore, an ALF filter which is optimal for the whole picture may not be optimal for a given block.

As another example, a potential problem with designing a new set of Wiener filters using a small block of a picture in order to get better local adaptivity is that the number of pixels available in a small block may not be enough to get a good estimate of the correlation matrices and vectors. This may lead to ill-posed Wiener-Hopf equations, which in turn may not give good ALF coefficients.

As another example, some example ALF designs define sixteen (16) fixed filters for each of the twenty-five (25) classes, thereby yielding a total of four hundred (400) filters. These filters may be used as predictor filters for the final filter coefficients for each class. The index of the predictor filter used is signaled for each class. This may cause high signaling overhead and reduce overall coding gain.

Another potential disadvantage of using a fixed set of filters as predictors is that the predictor set is not modified based on the new filters designed for previous frames. Because temporally neighboring frames are likely to have similar statistics, using the optimal filters for previous frames can lead to efficient prediction of optimal filters for the current frame.

As another example, some example ALF designs require two passes over the current frame to make block-level filter on/off decisions. This introduces additional encoder latency. The blocks for which ALF on/off flags are signaled do not align with coding units (CUs). Therefore, CU information such as mode, coded block flag (CBF), etc., cannot be considered in ALF on/off control decisions. Using this information may reduce on/off signaling overhead.

To address one or more of the problems discussed above, this disclosure describes techniques to further improve the coding gains and visual quality obtained by ALF. Video encoder 20 and/or video decoder 30 may apply any of the following itemized techniques individually. Alternatively, video encoder 20 and/or video decoder 30 may apply any combination of the itemized techniques discussed below.

According to some techniques of this disclosure, video encoder 20 may signal a set of ALF filters per block in one picture/slice/tile/tile group. The ALF set (e.g., the set of ALF filters mentioned above) can be indicated by a set index in a list of filter sets, in one example. The index, in some examples, identifies a particular set of ALF filters from among multiple sets of ALF filters included in the list.

a. In one example, the block can be the coding tree unit (CTU) or any other block. The block can be decoupled from the partitioning.

b. In one example, a list of multiple sets of filters per picture/slice/tile/tile group is provided, where each set may contain a filter assigned per class. A set index can be signaled per block. A flag can be signaled per block to indicate that ALF is not used.

c. The list of sets of filters can contain sets of fixed pre-trained filters and sets of filters derived using previous frames or filters signaled in a bitstream.

According to some examples of this disclosure, video encoder 20 and/or video decoder 30 may share the list of filter sets across different pictures. In one example, the filter set list can be initialized with pre-trained filters. After coding a picture, video encoder 20 may derive a new filter set based on the encoded picture and add the new filter set to the filter set list. Alternatively, the new filter set can replace an existing filter set in the list. After coding another picture, video encoder 20 may derive another filter set and include the derived filter set in the filter set list. In this example, the filter set list is common for all pictures and may be updated after coding a picture. From the decoder side, video decoder 30 may detect a signaling of the new filter set after decoding a picture or prior to the decoding of a picture.

According to some examples of this disclosure, video encoder 20 may allow signaling of a new set of filters per picture/slice/tile/tile group.

a. In one example, the new set of filters can be added to the filter set list. The updated list can then be used to filter a block in the next picture or pictures.

b. In another example, the updated list (containing the new set of filters derived using the current picture/slice/tile/tile group) can be used to filter a block in a current picture/slice/tile/tile group.

According to some examples of this disclosure, the filter set list may be updated with filters derived using previous pictures/slices/tiles/tile groups. The order in which filter sets are added or ordered in the filter set list can be fixed, predefined, or flexible. The list can be re-ordered per picture based on information related to the current picture and information related to the pictures from which corresponding filters in the list are derived. Video encoder 20 may indicate a filter set to video decoder 30 using an index in the filter set list. In some examples, video encoder 20 may assign a smaller index value to more frequently-used filters or newly-added filters.

a. In one example, the newly derived filter set can be added to the beginning of the list. In another example, the sets of filters derived using previous frames can be placed in the list before existing filter sets in the list, for example, the sets of fixed filters.

b. The ordering of filter sets in the list may depend on the other picture related information. For example, filters derived from pictures in the same temporal layer may be placed in the list before filters derived using pictures in another temporal layer.

c. In one example, the index of a filter set in the list may depend on whether the corresponding picture from which it is derived is a reference picture used for prediction of the current picture. Filters corresponding to a more frequently used reference picture may be placed before filters derived from other reference pictures.

d. In one example, filters derived using pictures coded with a similar QP to the current picture may be placed before filters derived from previous pictures coded with a different QP.

e. The maximum number of filters in the list can be limited. In one example, up to thirty two (32) sets of filters can be kept in the list. The maximum number of filter sets in the list can be signaled in slice header, sequence parameter set, picture parameter set or other high-level syntax information or elsewhere.

f. Video encoder 20 can use different numbers of bits to signal different set indexes. Fewer bits can be used to indicate a lower index position in the list (because filter sets near the top of a list are more likely to be selected) as compared to a higher index position.

According to some examples of this disclosure, some blocks can share the same ALF information, e.g., merging of the ALF information across two or more blocks. In one example, the index of the set of filters and/or ALF on/off flag (this flag indicates whether ALF is applied to a block) can be shared across multiple blocks. An ALF merge indicator may indicate which blocks are merged, and which ALF information is associated with the ALF merge indicator. The merge indicator can be an index, a flag, or any other syntax element.

a. ALF information of a block can be merged with a block above, or with a block to the left.
   b. More flexible ALF information merging that allows merging of one block with any other block (i.e., not necessarily a neighboring block) in the picture can also be used.

In some examples of this disclosure, the ALF on/off flag can be derived based on other existing block information. In one example, video decoder 30 may derive the ALF on/off flag based on existing block information, and as such, video encoder 20 may not signal the ALF on/off flag. Video encoder 20 may signal ALF on/off flag for a group of blocks, denoted as an ALF block. For example, blocks sharing the same ALF on/off flag can represent an ALF block. In another example, the ALF block may be equal to a block.

a. In one example, the ALF on/off flag may be derived based on the number of blocks in an ALF block, which share the same ALF on/off flag, having non-zero CBF flags. If the number of non-zero CBF flags is less than a certain threshold, then ALF may be disabled, or a default ALF filter is applied to those blocks.
   b. In the example of sub-bullet 'a' above, the number of non-zero transform coefficients can be counted instead of CBF flags. A threshold can be introduced for the counted coefficients, and if the number of non-zero transform coefficients is less than the threshold, ALF may be disabled for the blocks included in the ALF block, or a default ALF filter may be applied to those blocks.
   c. In another example, if the number of blocks in an ALF block coded with skip mode is larger than a certain threshold then ALF may be disabled for those blocks.
   d. In the example of sub-bullet 'c' above, the skip mode is used as an example, and other coding modes can be utilized in deriving the ALF on/off flag.

As discussed above, a block-based signaling mechanism may improve coding efficiency when using an ALF. For example, video encoder 20 may signal a filter set index per block to indicate which filter set out of a candidate set of filter sets is used for this block. The candidate set may include various filter sets, such as a newly signaled filter set for current picture/slice/tile/tile group and/or filter sets from previously coded pictures/slices/tile/tile groups.

In U.S. patent application Ser. No. 16/567,966, filed Sep. 11, 2019, a method and system to store filter sets of previously coded picture is discussed. In the examples described in U.S. patent application Ser. No. 16/567,966, luma and chroma can have separated buffers. In one example, the ALF coefficients of previously coded pictures are stored and allowed to be reused as ALF coefficients of a current picture. For a current picture, video encoder 20 may choose to use ALF coefficients stored for the reference pictures and then bypass the ALF coefficients signalling. In this case, video encoder 20 signals only an index to one of the reference pictures, and the stored ALF coefficients of the indicated reference picture are simply inherited (e.g., reused) for the current picture. To indicate the usage of temporal prediction, video encoder 20 first codes a flag before sending the index.

In some examples of JEM (e.g., JEM7), ALF parameters from at most six previous pictures/slices are stored in a separate array for each temporal layer. For example, if there are 5 temporal layers in a hierarchical B/P coding structure (which is the case in a random access setting used in current video coding standardization), both video encoder 20 and video decoder 30 use a 5×6 memory array so that in total, there are 30 memory elements to store previously obtained ALF parameters.

The design of JEM7 effectively deletes the stored ALF parameters when an Intra Random Access Picture (IRAP or I-frame) is encoded/decoded. To avoid duplication, ALF parameters are stored in the memory only if they are newly obtained through reception at video decoder 30 (for video encoder 20, new parameters are obtained via estimation/training). Storing of parameters operates in a first-in-first-out (FIFO) fashion; so if the array is full, a new set of ALF parameter values overwrites the oldest parameters, in the decoding order.

The main purpose of using a 2D array (e.g., in memory) for storing ALF parameters is to preserve temporal scalability in a hierarchical B/P frame coding structure. A frame at layer $T_i$ cannot depend on (e.g., cannot be predicted from) a frame at layer $T_k$ for i<k. In other words, a frame/slice at a lower temporal layer (e.g., $T_2$) cannot depend on frames/slices at higher layers (e.g., $T_3$ and $T_4$). The current temporal prediction in ALF preserves temporal scalability by simply storing ALF parameters obtained from different temporal layers in different rows of the 2-D array and ensuring that those parameters are used without breaking dependency structure in hierarchical B/P frames.

One of the problems in the design of temporal prediction in JEM7 is that it requires a large amount of memory. Specifically, a 5×6 array with 30 memory elements is needed at both video encoder 20 and video decoder 30 to store ALF parameters. In view of this problem, the examples described below can reduce the memory requirements by using a 1D array, while still preserving the temporal scalability. The following sections present a description of examples for storing and using a 1D array for temporal prediction in ALF.

Figure 4A:
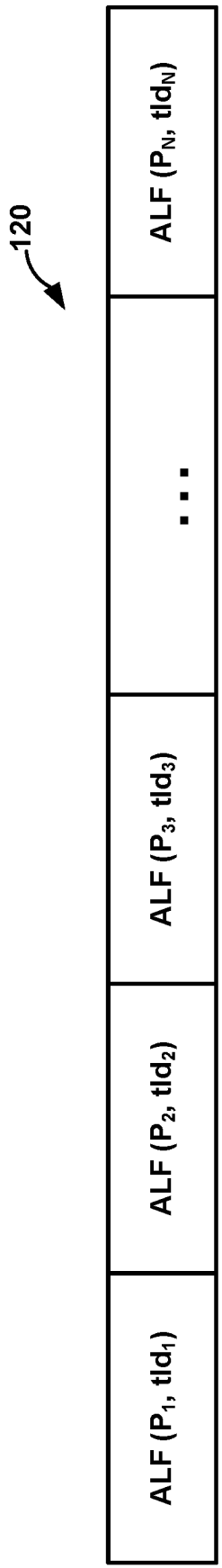
FIGS. 4A-4B show example arrays for storing adaptive loop filter (ALF) parameters.

FIG. 4A shows a single array 120 of size N used to store ALF parameters ($P_1, P_2, \ldots, P_N$) and associated temporal layer IDs ($tId_1, tId_2, \ldots, tId_n$). Each memory element of array 120 stores (i) ALF parameters and (ii) the temporal layer ID (tId) indicating from which layer the corresponding ALF parameters are estimated. The temporal layer information is used to ensure that an ALF parameter obtained from a higher temporal layer (e.g., tId=4) is not used for encoding/decoding a frame/slice at a lower temporal layer (e.g., tId=3).

A combination of the following listed methods may be applied to load, store and use ALF parameters for temporal prediction.

1) To be used in temporal prediction of ALF parameters, an array may store parameters from either B- or P-slices.

2) In the array, the entries of ALF parameters shall be stored in a certain order (e.g., by following the decoding order). When all the N entries are used for storing (i.e., when the array is full), the newly obtained parameters can be stored by removing one entry and then adding the new parameters in the array.

As an example, this may be done in a FIFO (first-in-first-out) fashion, where the last entry in the array (i.e., the oldest set of parameters) is removed when the array is full, and the new parameters are stored in the first element of the array.

In another example, the ALF parameters replace certain stored parameters in the buffer having the same temporal layer ID; for example, certain parameters may be the oldest parameters in the buffer, or less used, or any other rule may be applied.

3) A nonnegative index value, called prevIdx, may be signaled to identify which set of ALF parameters is loaded/used from the buffer for encoding/decoding.

A variable length code such as unary code may be used to signal prevIdx. The total available number of parameters for a certain temporal layer Id can be counted in the stored buffer, and truncated binarization can be used to signal the prevIdx having total available number of filters minus 1 as a max index. However, truncated coding may introduce mismatch between encoder and decoder, for example, when some pictures are lost in the transmission.

The prevIdx can take values from 0 up to N−1. Depending on the type of hierarchical frame structure used for coding, the maximum value of prevIdx can be smaller.

When coding a slice/picture, the possible candidates for temporal prediction may be decided by traversing the sets included in the array and all or some parameter sets with equal or smaller tId are treated as effective candidates.

Figure 4B:

The signaling of the array entry (e.g., determining the ALF parameters used for coding) may depend on the temporal layer ID of the current frame being coded. Specifically, the prevIdx may correspond to a different entry in the array depending on the temporal layer ID of the current frame being encoded/decoded.

i. FIG. 4B shows an array 130 storing an N=5 set of ALF parameters obtained from different temporal layers ($tId_1=1$, $tId_2=2$, $tId_3=2$, $tId_4=1$ and $tId_5=3$). As an example, illustrated in FIG. 4B, prevIdx=1 may point to the following two different entries in the array depending on the tId of the current frame being coded:

1. prevIdx=1 corresponds to the $4^{th}$ entry in the array, storing ALF ($P_4$, 1), when coding a frame with tId=1, since it is the second possible option allowed for coding to preserve temporal scalability, where ALF ($P_4$, 1) is the first candidate signaled with prevIdx=0.
2. prevIdx=1 corresponds to the $2^{nd}$ entry in the array, storing ALF ($P_2$, 2), when coding a frame with tId=2, since it is the second possible option allowed for coding, where ALF ($P_1$, 1) is the first option corresponding to prevIdx=0.

In case of a frame loss (e.g., due to a packet loss when sending the video bitstream through a network), a video decoder may choose not to add any entry to the array and may introduce a dummy entry, so even when the picture is lost, a dummy entry is added to the buffer. In either case, as long as the methods listed above are applied, the temporal scalability is preserved. In other words, when a frame at a higher level is lost (e.g., $T_3$), the frames at lower layers are still decodable (e.g., $T_1$ and $T_2$).

In another example, pictures or slices with the lower temporal layer ID may carry information about the ALF parameters of the higher temporal IDs. In this case, if a picture with higher temporal layer ID is lost, the parameters can be obtained from the pictures with lower temporal layer ID. Those parameters may also indicate whether the higher temporal layer ID picture carries such ALF parameters, such that those parameters or dummy parameters may be added to the buffer.

In another example, decoder picture buffer (DPB) management methods can be applied to temporal ALF parameters handling, since DPB management includes handling of the lost pictures.

4) Depending on the importance of ALF parameters, (e.g., importance can be measured based on how frequently they are used or based on their temporal layer information), some of those important ALF parameters can be fixed and kept in the buffer until a next I-slice is coded. Such an importance metric can be used to rank and reorder the entries to reduce the signaling overhead of signaling prevIdx (e.g., unary coding).

5) Additional decisions or restrictions on loading and storing ALF parameters (management of the buffer) can be made based on any other side information (in addition to temporal layer ID) or based on an importance measure that can be also stored with the ALF parameters.

6) Separate buffers can be used for separate coding luma and chroma channels. As a result, each buffer may have different signaling of prevIdx to determine ALF parameters used for luma and chroma channels separately.

In Y. Wang, et. al., "AHG17: On header parameter set (HPS)," Joint Video Experts Team (JVET) of ITU-T SG 16 WP 3 and ISO/IEC JTC 1/SC 29/WG 11, $13^{th}$ Meeting: Marrakech, Mass., 9-18 Jan. 2019, (hereinafter, "JVET-M0132"), the adaptive parameter set (APS) was proposed. In some examples, the adaptive parameter set is also referred to as an adaptation parameter set. An APS is used to carry ALF parameters (e.g., both luma and chroma filter parameters). When ALF is applied to a picture/slice/tile/tile group, video encoder 20 signals an APS index such that the ALF parameters in the corresponding APS will be used by video decoder 30 to apply an ALF to a picture/slice/tile/tile group. However, since the signaling of the APS itself is decoupled from a picture/slice/tile/tile group, it would be desirable to modify the above examples to be aligned with such an APS in order to increase coding efficiency. That is, in some examples, the ALF is applied to blocks of a slice level, and the particular ALF parameters used are applied at a block level. However, APSs are signaled at a higher level. This disclosure describes examples for indicating the APSs that may be used for luma and chroma components of a slice. In the examples below, the previously coded filters may be ALFs or other types of filters.

In some examples, video encoder 20 may be configured to encode and signal a variable (or syntax element, the terms are used interchangeably in the following examples) in sequence parameter set/picture parameter set/slice header/tile/tile group header to indicate how many previously coded filter sets could be used for each block corresponding to the sequence parameter set/picture parameter set/slice header/tile/tile group header. Video decoder 30 may be configured to decode such a variable/syntax element and use one or more of the previously coded filter sets for various blocks.

In one such example, video encoder 20 may encode and signal one variable (e.g., syntax element in an encoded bitstream) that defines the maximum number of previously signaled filters that video decoder 30 may use for blocks from all components in the sequence/picture/slice/tile/tile group.

In another example, video encoder 20 may encode and signal one variable (e.g., syntax element in an encoded bitstream) to indicate the maximum number of previously signaled filters that video decoder 30 may use for luma blocks in the sequence/picture/slice/tile/tile group. Video encoder 20 may encode and signal another variable (e.g., syntax element in an encoded bitstream) to indicate the maximum number of previously signaled filters that video decoder 30 may use for chroma blocks in the sequence/picture/slice/tile/tile group.

In another example, the maximum number of previously signaled filters that video decoder 30 may use for blocks from all color components (e.g., luma and chroma components) could be fixed and determined without signaling. In another example, the maximum number of previously signaled filters that video decoder 30 may use for blocks from the same color component (e.g., luma and chroma) could be fixed and determined without signaling. In another example, the maximum number of previously signaled filters that video decoder 30 may use for blocks from the same color component (e.g., luma or chroma) and with the same coding information could be fixed and determined without signaling. The coding information could be slice type, quantization parameter, prediction type, motion information, intra mode, and/or other coding information.

In some examples (which may be combined as would be recognized by one of skill in the art with examples of the previous paragraphs), video encoder 20 and video decoder 30 may use a first-in-first-out (FIFO) buffer to store parameters of previously coded ALF filters. In one example, video encoder 20 and video decoder 30 may be configured to use the same buffer for luma and chroma components, such that one element in the buffer is used to store a set of luma and chroma filters from the same picture/slice/tile/tile group. In another example, video encoder 20 and video decoder 30 may be configured to use separate FIFO buffers for luma and chroma components. When filter parameters of a component are signaled, video decoder 30 will push the signaled filter parameters into the buffer of the corresponding color component.

To align block-based ALF filter set index signaling with the use of one or more APSs that include respective sets of ALF parameters, video encoder 20 and video decoder 30 may be configured to code, at each picture, slice, tile, and/or tile group header, when ALF is enabled, a variable (e.g., syntax element in an encoded bitstream) that indicates the number of APSs that are used for a current picture, slice, tile, and/or tile group header. For example, at the slice level, video encoder 20 and video decoder 30 may be configured to code a variable that indicates the number of APSs that are used for blocks of the current slice when ALF is enabled for that slice. In addition, after coding the variable indicating the number of APSs, video encoder 20 and video decoder 30 may code the index of each APS available for use for the current picture/slice/tile/tile group header. Then, for each respective block in the slice, video encoder 20 and video decoder 30 may code the index of a particular APS that includes the ALF parameters to use for the respective block. In this example, video encoder 20 and video decoder 30 may code a set of APS indices for luma components and a set of APS indices for chroma components.

In one example, for complexity reduction, video encoder 20 and video decoder 30 may be configured to use the same number of APSs and the same indices of the APSs for both luma and chroma components. In another example, for better adaptation to the characteristics of luma and chroma components and to achieve improved compression efficiency, luma and chroma components have their own number of APSs and indices of the APSs that are used for blocks of a picture, slice, tile, and/or tile group header. That is, video encoder 20 and video decoder 30 may be configured to code different numbers of APSs and indices of APS for luma and chroma components used for blocks of a picture, slice, tile, and/or tile group header. Said differently, the number of APSs and indices of APSs (and thus ALF parameters) are independent for luma and chroma components. In some examples, for simplicity, the number of APSs for a component could be fixed without signaling, which may be dependent on coding information. For example, for a picture/slice/tile/tile group that is intra-frame coded, no filter sets from other pictures/slices/tiles/tile groups are allowed. In one example, two chroma components in a picture/slice/tile group may only use one APS. For another example, each chroma components in a picture/slice/tile group may only use one APS.

In accordance with one example of the disclosure, video encoder 20 may be configured to encode, for a video bitstream for which adaptive loop filtering is enabled for luma blocks of one or more of a picture, a slice, a tile, or a tile group, a first syntax element indicating a number of adaptive parameter sets for the luma blocks of the one or more of the picture, the slice, the tile, or the tile group. Video encoder 20 may be further configured to encode a plurality of first adaptive parameter set indices for the luma blocks of the one or more of the picture, the slice, the tile, or the tile group based on the number of adaptive parameter sets for the luma blocks of the one or more of the picture, the slice, the tile, or the tile group. For example, if five APSs are used for applying ALF to luma blocks of a slice, video encoder 20 would also encode the indices of the five APSs used. Of course, other numbers of APSs may be used for a slice. Video encoder 20 is further configured to encode, for the video bitstream for which adaptive loop filtering is enabled for chroma blocks of the one or more of the picture, the slice, the tile, or the tile group, a second adaptive parameter set index for the chroma blocks of the one or more of the picture, the slice, the tile, or the tile group. In this case, chroma blocks only have a single APS, and as such, only the index of the APS is encoded and signaled.

Video decoder 30 may be configured to perform techniques reciprocal to those described above for video encoder 20. For example, video decoder 30 may be configured to decode, from a video bitstream for which adaptive loop filtering is enabled for luma blocks of one or more of a picture, a slice, a tile, or a tile group, a first syntax element indicating a number of adaptive parameter sets for the luma blocks of the one or more of the picture, the slice, the tile, or the tile group. Video decoder 30 may further be configured to decode a plurality of first adaptive parameter set indices for the luma blocks of the one or more of the picture, the slice, the tile, or the tile group based on the number of adaptive parameter sets for the luma blocks of the one or more of the picture, the slice, the tile, or the tile group. Video decoder 30 may also decode, from the video bitstream for which adaptive loop filtering is enabled for chroma blocks of the one or more of the picture, the slice, the tile, or the tile group, a second adaptive parameter set index for the chroma blocks of the one or more of the picture, the slice, the tile, or the tile group. Video decoder 30 may then apply first adaptive loop filters to the luma blocks of the one or more of the picture, the slice, the tile, or the tile group based on the plurality of first adaptive parameter set indices. For example, video decoder 30 may decode syntax elements indicating a particular APS to use for a particular luma block of the one or more of the picture, the slice, the tile, or the tile group, and then apply the ALF parameters from the indicated APS to that particular luma block. Likewise, video decoder 30 may apply a second adaptive loop filter to the chroma blocks of the one or more of the picture, the slice, the tile, or the tile group based on the second adaptive parameter set index. For example, video decoder 30 may apply the ALF parameters from the indicated APS of the second adaptive parameter set index to the chroma blocks.

In the above examples, video encoder 20 may signal and video decoder 30 may receive the first syntax element indicating the number of adaptive parameter sets for the luma blocks of the one or more of the picture, the slice, the tile, or the tile group, the plurality of first adaptive parameter set indices for the luma blocks of the one or more of the picture, the slice, the tile, or the tile group, and the second adaptive parameter set index for the chroma blocks of the one or more of the picture, the slice, the tile, or the tile group in a picture/slice/tile/tile group header.

In some examples, the video bitstream may be defined so as to separate the information of an APS, such that an APS for luma components (Luma_APS) is used to carry a set of luma filters only and an APS for chroma components (chroma_APS) is used to carry chroma filter parameter only.

Accordingly, in one example, each of the number of adaptive parameter sets for the luma blocks of the one or more of the picture, the slice, the tile, or the tile group includes a respective set of luma adaptive loop filters. In other examples, each of the number of adaptive parameter sets for the luma blocks of the one or more of the picture, the slice, the tile, or the tile group includes only the respective set of luma adaptive loop filters. Likewise, in one example, the adaptive parameter set corresponding to the second adaptive parameter set index includes a set of chroma adaptive loop filters. In another example, the adaptive parameter set corresponding to the second adaptive parameter set index includes only set of chroma adaptive loop filters.

As described above, instead of using one APS index for both luma and chroma components, separate APS indices are used so that the APS could be updated partially. For example, video encoder 20 and video decoder 30 may code an index for a luma APS index (Luma_APS_index) to indicate the APS for which the luma filter information is updated. Video encoder 20 and video decoder 30 may code a chroma APS index (Chroma_APS_index) to indicate the APS whose chroma filter information is updated.

Accordingly, in another example of the disclosure, video encoder 20 and video decoder 30 may encode/decode a second syntax element indicating if luma adaptive loop filter information for the luma blocks of the one or more of the picture, the slice, the tile, or the tile group is updated, and encode/decode a third syntax element indicating if chroma adaptive loop filter information for the chroma blocks of the one or more of the picture, the slice, the tile, or the tile group is updated.

According to some examples, video encoder 20 and video decoder 30 may use a first-in-first-out (FIFO) buffer to store previously coded ALF filters when APSs are used. For each picture/slice/tile/tile group, video encoder 20 may signal a new_filter_set_flag such that a new filter set is derived from an APS with an APS index signaled; otherwise, no filter parameters are derived from any APS. After decoding of the picture/slice/tile/tile group, if the new_filter_set flag is true, then video decoder 30 may push the filter set information from the APS into the FIFO buffer. Otherwise, the FIFO buffer is not changed. The FIFO buffer could be in fixed or variable length. The techniques described above for FIFO buffers could also be applied.

In some examples, the FIFO buffers may be shared among all of the tile groups/slices in a picture. The indices of APSs which will be added to the FIFO buffers after decoding the picture may be signaled in some point in the middle of the bitstream of a picture. For example, video encoder 20 may signal such information at the beginning, the end, or some other place of a picture. In another example, parameters of filter set(s) from one or more fixed tile groups/slices could be used to update the FIFO buffers without signaling which filter set will be added to the buffers. For example, the first n signaled filter sets from the tile groups/slices in the picture will be added to the FIFO buffers after the whole picture is reconstructed. In another example, the last n signaled filter sets from the tile groups/slices in the picture will be added to the FIFO buffers after the whole picture is reconstructed. In the examples above, n is a positive integer. The value of n could be fixed or signaled. In another example, some rules to select more than one filter set in a picture could be defined and applied at both video encoder 20 and video decoder 30.

Figure 5:
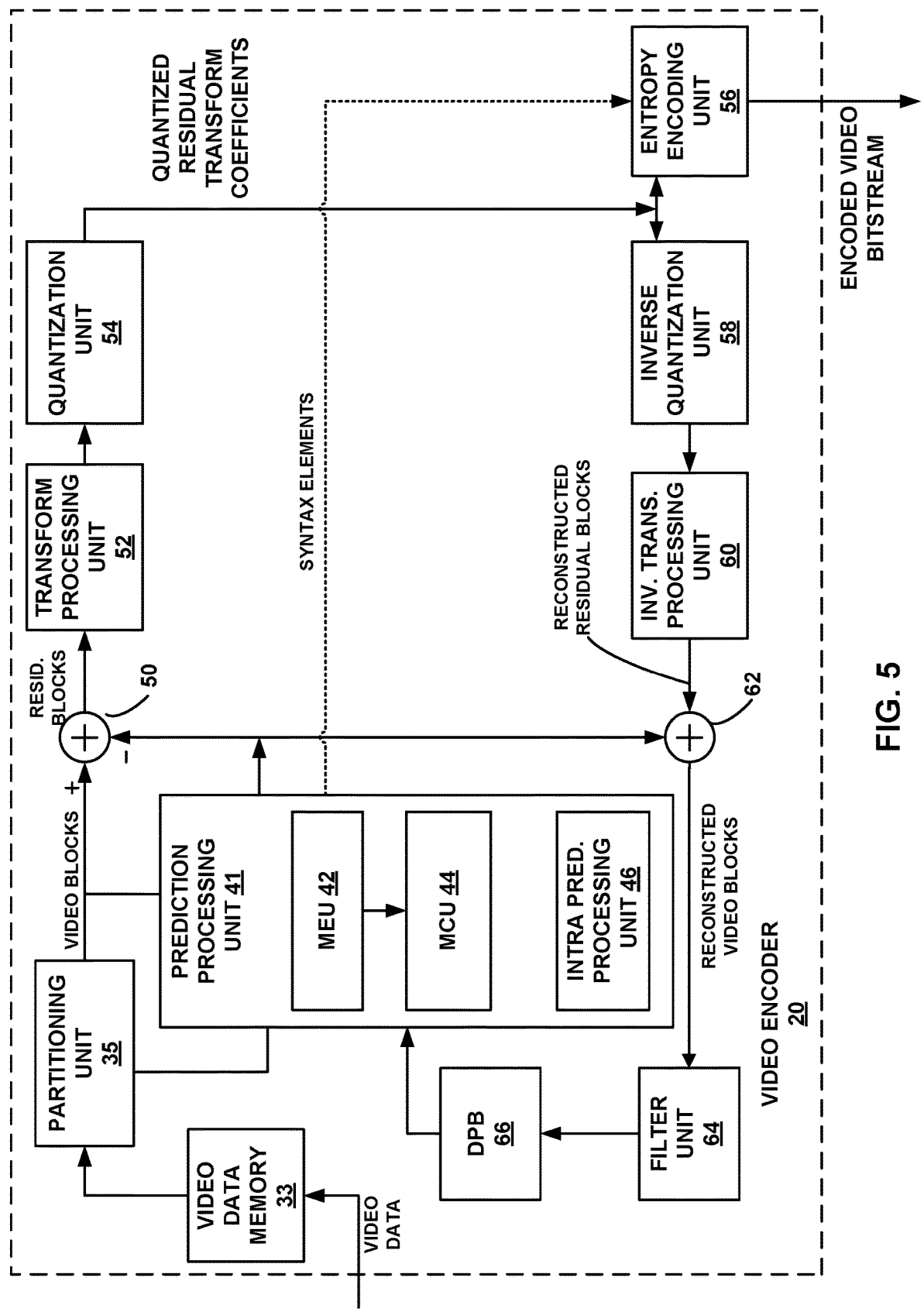
FIG. 5 is a block diagram illustrating an example video encoder that may implement the techniques described in this disclosure.

FIG. 5 is a block diagram illustrating an example video encoder 20 that may implement the techniques for ALF using APSs described in this disclosure. Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial-based compression modes. Inter-modes, such as uni-directional prediction (P mode) or bi-prediction (B mode), may refer to any of several temporal-based compression modes.

In the example of FIG. 5, video encoder 20 includes a video data memory 33, partitioning unit 35, prediction processing unit 41, summer 50, transform processing unit 52, quantization unit 54, and, entropy encoding unit 56. Prediction processing unit 41 includes motion estimation unit (MEU) 42, motion compensation unit (MCU) 44, and intra prediction processing unit 46. For video block reconstruction, video encoder 20 also includes inverse quantization unit 58, inverse transform processing unit 60, summer 62, filter unit 64, and decoded picture buffer (DPB) 66.

As shown in FIG. 5, video encoder 20 receives video data and stores the received video data in video data memory 33. Video data memory 33 may store video data to be encoded by the components of video encoder 20. The video data stored in video data memory 33 may be obtained, for example, from video source 18. DPB 66 may be a reference picture memory that stores reference video data for use in encoding video data by video encoder 20, e.g., in intra- or inter-coding modes. Video data memory 33 and DPB 66 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 33 and DPB 66 may be provided by the same memory device or separate memory devices. In various examples, video data memory 33 may be on-chip with other components of video encoder 20, or off-chip relative to those components.

Partitioning unit 35 retrieves the video data from video data memory 33 and partitions the video data into video blocks. This partitioning may also include partitioning into slices, tiles, or other larger units, as wells as video block partitioning, e.g., according to a quadtree structure of LCUs and CUs. Video encoder 20 generally illustrates the components that encode video blocks within a video slice to be encoded. The slice may be divided into multiple video blocks (and possibly into sets of video blocks referred to as tiles). Prediction processing unit 41 may select one of a plurality of possible coding modes, such as one of a plurality of intra coding modes or one of a plurality of inter coding modes, for the current video block based on error results (e.g., coding rate and the level of distortion). Prediction processing unit 41 may provide the resulting intra- or inter-coded block to summer 50 to generate residual block data and to summer 62 to reconstruct the encoded block for use as a reference picture.

Intra prediction unit processing 46 within prediction processing unit 41 may perform intra-predictive coding of the current video block relative to one or more neighboring blocks in the same frame or slice as the current block to be coded to provide spatial compression. Motion estimation unit 42 and motion compensation unit 44 within prediction processing unit 41 perform inter-predictive coding of the current video block relative to one or more prediction blocks in one or more reference pictures to provide temporal compression.

Motion estimation unit 42 may be configured to determine the inter-prediction mode for a video slice according to a predetermined pattern for a video sequence. The predetermined pattern may designate video slices in the sequence as P slices or B slices. Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a prediction block within a reference picture.

A prediction block is a block that is found to closely match the PU of the video block to be coded in terms of pixel difference, which may be determined by sum of absolute difference (SAD), sum of square difference (SSD), or other difference metrics. In some examples, video encoder 20 may calculate values for sub-integer pixel positions of reference pictures stored in DPB 66. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a prediction block of a reference picture. The reference picture may be selected from a first reference picture list (List 0) or a second reference picture list (List 1), each of which identify one or more reference pictures stored in DPB 66. Motion estimation unit 42 sends the calculated motion vector to entropy encoding unit 56 and motion compensation unit 44.

Motion compensation, performed by motion compensation unit 44, may involve fetching or generating the prediction block based on the motion vector determined by motion estimation, possibly performing interpolations to sub-pixel precision. Upon receiving the motion vector for the PU of the current video block, motion compensation unit 44 may locate the prediction block to which the motion vector points in one of the reference picture lists. Video encoder 20 forms a residual video block by subtracting pixel values of the prediction block from the pixel values of the current video block being coded, forming pixel difference values. The pixel difference values form residual data for the block, and may include both luma and chroma difference components. Summer 50 represents the component or components that perform this subtraction operation. Motion compensation unit 44 may also generate syntax elements associated with the video blocks and the video slice for use by video decoder 30 in decoding the video blocks of the video slice.

After prediction processing unit 41 generates the prediction block for the current video block, either via intra prediction or inter prediction, video encoder 20 forms a residual video block by subtracting the prediction block from the current video block. The residual video data in the residual block may be included in one or more TUs and applied to transform processing unit 52. Transform processing unit 52 transforms the residual video data into residual transform coefficients using a transform, such as a discrete cosine transform (DCT) or a conceptually similar transform. Transform processing unit 52 may convert the residual video data from a pixel domain to a transform domain, such as a frequency domain.

Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. In another example, entropy encoding unit 56 may perform the scan.

Following quantization, entropy encoding unit 56 entropy encodes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding methodology or technique. Following the entropy encoding by entropy encoding unit 56, the encoded bitstream may be transmitted to video decoder 30, or archived for later transmission or retrieval by video decoder 30. Entropy encoding unit 56 may also entropy encode the motion vectors and the other syntax elements for the current video slice being coded.

Inverse quantization unit 58 and inverse transform processing unit 60 apply inverse quantization and inverse transformation, respectively, to reconstruct the residual block in the pixel domain for later use as a reference block of a reference picture. Motion compensation unit 44 may calculate a reference block by adding the residual block to a prediction block of one of the reference pictures within one of the reference picture lists. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reconstructed block.

Filter unit 64 filters the reconstructed block (e.g. the output of summer 62) and stores the filtered reconstructed block in DPB 66 for uses as a reference block. The reference block may be used by motion estimation unit 42 and motion compensation unit 44 as a reference block to inter-predict a block in a subsequent video frame or picture. Filter unit 64 may perform any type of filtering such as deblock filtering, SAO filtering, peak SAO filtering, ALF, and/or GALF, and/or other types of loop filters. A deblock filter may, for example, apply deblocking filtering to filter block boundaries to remove blockiness artifacts from reconstructed video. A peak SAO filter may apply offsets to reconstructed pixel values in order to improve overall coding quality. Additional loop filters (in loop or post loop) may also be used.

Filter unit 64, or other structural components of video encoder 20 may be configured to perform the techniques of the disclosure. For example, filter unit 64 may be configured to encode, for a video bitstream for which adaptive loop filtering is enabled for luma blocks of one or more of a picture, a slice, a tile, or a tile group, a first syntax element indicating a number of adaptive parameter sets for the luma blocks of the one or more of the picture, the slice, the tile, or the tile group. Filter unit 64 may be further configured to encode a plurality of first adaptive parameter set indices for the luma blocks of the one or more of the picture, the slice, the tile, or the tile group based on the number of adaptive parameter sets for the luma blocks of the one or more of the picture, the slice, the tile, or the tile group. For example, if five APSs are used for applying ALF to luma blocks of a slice, filter unit 64 would also encode the indices of the five APSs used. Of course, other numbers of APSs may be used for a slice. Filter unit 64 may be further configured to encode, for the video bitstream for which adaptive loop filtering is enabled for chroma blocks of the one or more of the picture, the slice, the tile, or the tile group, a second adaptive parameter set index for the chroma blocks of the one or more of the picture, the slice, the tile, or the tile group. In this case, chroma blocks only have a single APS, and as such, only the index of the APS is encoded and signaled.

Figure 6:
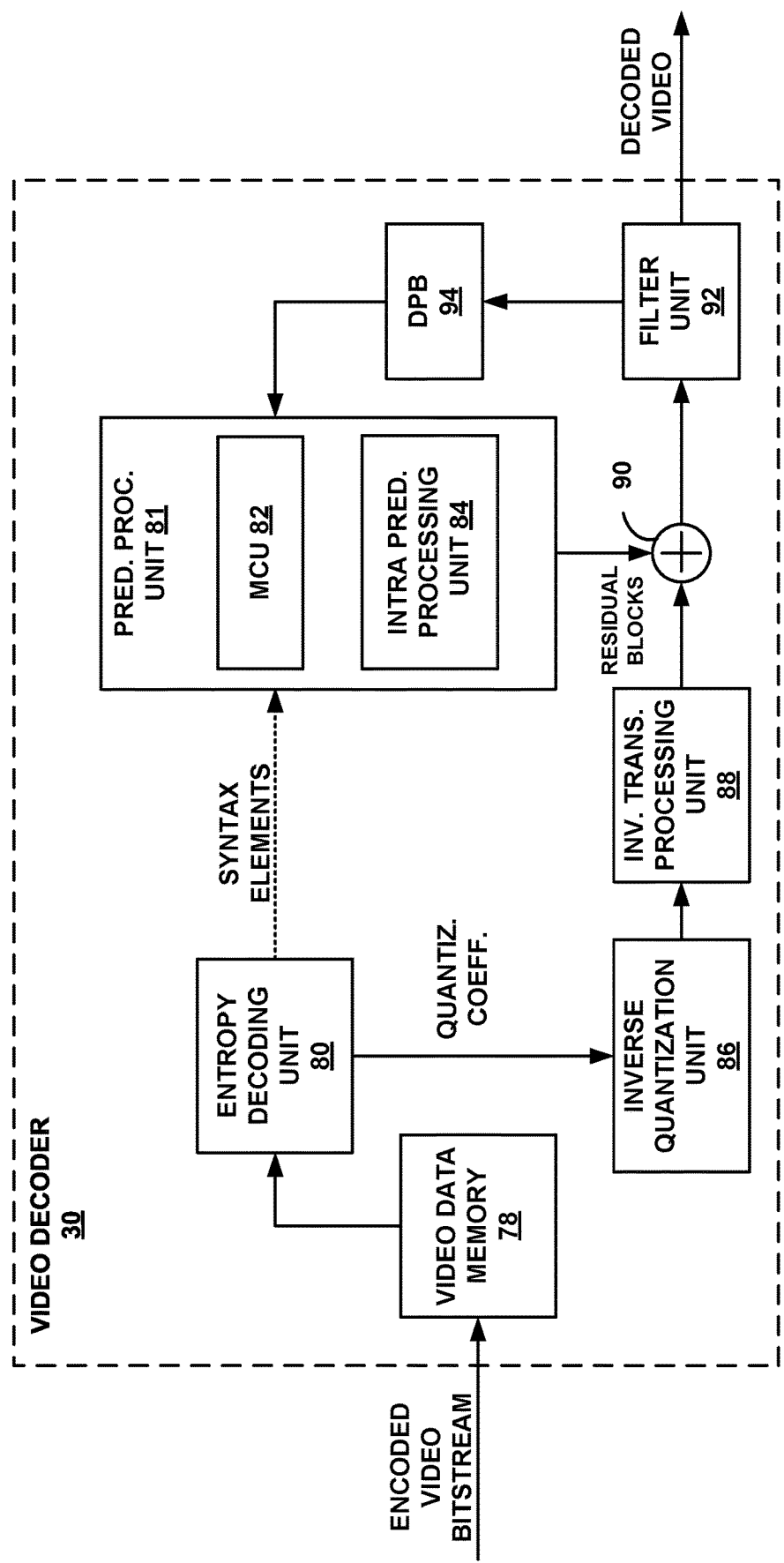
FIG. 6 is a block diagram illustrating an example video decoder that may implement the techniques described in this disclosure.

FIG. 6 is a block diagram illustrating an example video decoder 30 that may implement the techniques described in this disclosure. Video decoder 30 of FIG. 6 may, for example, be configured to receive the signaling described above with respect to video encoder 20 of FIG. 5. In the example of FIG. 6, video decoder 30 includes video data memory 78, entropy decoding unit 80, prediction processing unit 81, inverse quantization unit 86, inverse transform processing unit 88, summer 90, DPB 94, and filter unit 92. Prediction processing unit 81 includes motion compensation unit 82 and intra prediction processing unit 84. Video decoder 30 may, in some examples, perform a decoding pass generally reciprocal to the encoding pass described with respect to video encoder 20 from FIG. 5.

During the decoding process, video decoder 30 receives an encoded video bitstream that represents video blocks of an encoded video slice and associated syntax elements from video encoder 20. Video decoder 30 stores the received encoded video bitstream in video data memory 78. Video data memory 78 may store video data, such as an encoded video bitstream, to be decoded by the components of video decoder 30. The video data stored in video data memory 78 may be obtained, for example, via link 16, from storage device 26, or from a local video source, such as a camera, or by accessing physical data storage media. Video data memory 78 may form a coded picture buffer (CPB) that stores encoded video data from an encoded video bitstream. DPB 94 may be a reference picture memory that stores reference video data for use in decoding video data by video decoder 30, e.g., in intra- or inter-coding modes. Video data memory 78 and DPB 94 may be formed by any of a variety of memory devices, such as DRAM, SDRAM, MRAM, RRAM, or other types of memory devices. Video data memory 78 and DPB 94 may be provided by the same memory device or separate memory devices. In various examples, video data memory 78 may be on-chip with other components of video decoder 30, or off-chip relative to those components.

Entropy decoding unit 80 of video decoder 30 entropy decodes the video data stored in video data memory 78 to generate quantized coefficients, motion vectors, and other syntax elements. Entropy decoding unit 80 forwards the motion vectors and other syntax elements to prediction processing unit 81. Video decoder 30 may receive the syntax elements at the video slice level and/or the video block level.

When the video slice is coded as an intra-coded (I) slice, intra prediction processing unit 84 of prediction processing unit 81 may generate prediction data for a video block of the current video slice based on a signaled intra prediction mode and data from previously decoded blocks of the current frame or picture. When the video frame is coded as an inter-coded slice (e.g., B slice or P slice), motion compensation unit 82 of prediction processing unit 81 produces prediction blocks for a video block of the current video slice based on the motion vectors and other syntax elements received from entropy decoding unit 80. The prediction blocks may be produced from one of the reference pictures within one of the reference picture lists. Video decoder 30 may construct the reference frame lists, List 0 and List 1, using default construction techniques based on reference pictures stored in DPB 94.

Motion compensation unit 82 determines prediction information for a video block of the current video slice by parsing the motion vectors and other syntax elements, and uses the prediction information to produce the prediction blocks for the current video block being decoded. For example, motion compensation unit 82 uses some of the received syntax elements to determine a prediction mode (e.g., intra- or inter-prediction) used to code the video blocks of the video slice, an inter-prediction slice type (e.g., B slice or P slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 82 may also perform interpolation based on interpolation filters. Motion compensation unit 82 may use interpolation filters as used by video encoder 20 during encoding of the video blocks to calculate interpolated values for sub-integer pixels of reference blocks. In this case, motion compensation unit 82 may determine the interpolation filters used by video encoder 20 from the received syntax elements and use the interpolation filters to produce prediction blocks.

Inverse quantization unit 86 inverse quantizes, i.e., de-quantizes, the quantized transform coefficients provided in the bitstream and decoded by entropy decoding unit 80. The inverse quantization process may include use of a quantization parameter calculated by video encoder 20 for each video block in the video slice to determine a degree of quantization and, likewise, a degree of inverse quantization that should be applied. Inverse transform processing unit 88 applies an inverse transform, e.g., an inverse DCT, an inverse integer transform, or a conceptually similar inverse transform process, to the transform coefficients in order to produce residual blocks in the pixel domain.

After prediction processing unit generates the prediction block for the current video block using, for example, intra or inter prediction, video decoder 30 forms a reconstructed video block by summing the residual blocks from inverse transform processing unit 88 with the corresponding prediction blocks generated by motion compensation unit 82. Summer 90 represents the component or components that perform this summation operation.

Filter unit 92 filters the reconstructed block (e.g. the output of summer 90) and stores the filtered reconstructed block in DPB 94 for uses as a reference block. The reference block may be used by motion compensation unit 82 as a reference block to inter-predict a block in a subsequent video frame or picture. Filter unit 92 may perform any type of filtering such as deblock filtering, SAO filtering, peak SAO filtering, ALF, and/or GALF, and/or other types of loop filters. A deblock filter may, for example, apply deblocking filtering to filter block boundaries to remove blockiness artifacts from reconstructed video. A peak SAO filter may apply offsets to reconstructed pixel values in order to improve overall coding quality. Additional loop filters (in loop or post loop) may also be used.

Filter unit 92, and/or other structural components of video decoder 30, may be configured to perform techniques reciprocal to those described above for video encoder 20 and filter unit 64. For example, video decoder 30 may be configured to decode, from a video bitstream for which adaptive loop filtering is enabled for luma blocks of one or more of a picture, a slice, a tile, or a tile group, a first syntax element indicating a number of adaptive parameter sets for the luma blocks of the one or more of the picture, the slice, the tile, or the tile group. Video decoder 30 may further be configured to decode a plurality of first adaptive parameter set indices for the luma blocks of the one or more of the picture, the slice, the tile, or the tile group based on the number of adaptive parameter sets for the luma blocks of the one or more of the picture, the slice, the tile, or the tile group. Video decoder 30 may also decode, from the video bitstream for which adaptive loop filtering is enabled for chroma blocks of the one or more of the picture, the slice, the tile, or the tile group, a second adaptive parameter set index for the chroma blocks of the one or more of the picture, the slice, the tile, or the tile group. Filter unit 92 may then apply first adaptive loop filters to the luma blocks of the one or more of the picture, the slice, the tile, or the tile group based on the plurality of first adaptive parameter set indices. For example, video decoder 30 may decode syntax elements indicating a particular APS to use for a particular luma block of the slice, and then filter unit 92 may apply the ALF parameters from the indicated APS to that particular luma block. Likewise, filter unit 92 may apply a second adaptive loop filter to the chroma blocks of the one or more of the picture, the slice, the tile, or the tile group based on the second adaptive parameter set index. For example, filter unit 92 may apply the ALF parameters from the indicated APS of the second adaptive parameter set index to the chroma blocks.

Figure 7:
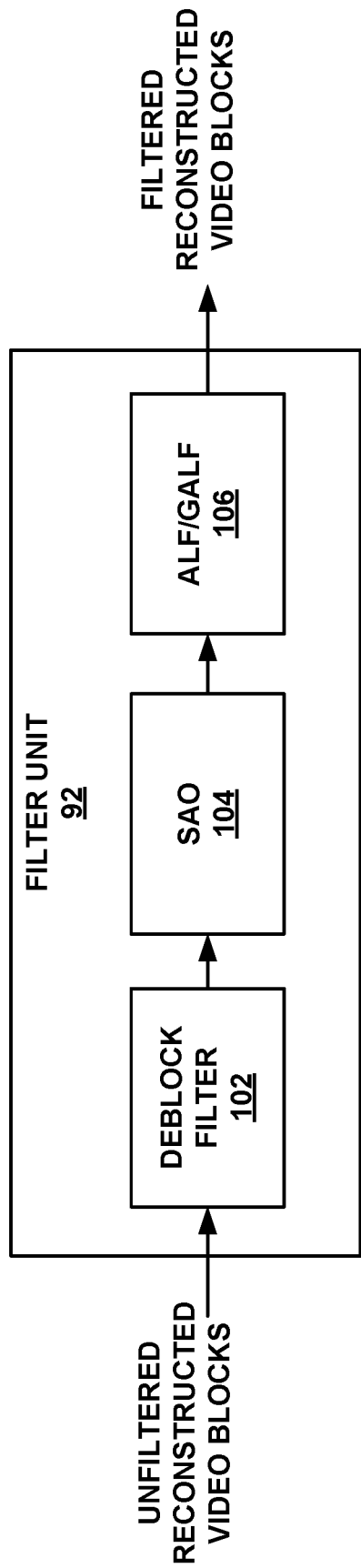
FIG. 7 shows an example implementation of a filter unit for performing the techniques of this disclosure.

FIG. 7 shows an example implementation of filter unit 92. Filter unit 64 may be implemented in the same manner. Filter units 64 and 92 may perform the techniques of this disclosure, possibly in conjunction with other components of video encoder 20 or video decoder 30. In the example of FIG. 7, filter unit 92 includes deblock filter 102, SAO filter 104, and ALF/GALF filter 106. SAO filter 104 may, for example, be configured to determine offset values for samples of a block in the manner described in this disclosure.

Filter unit 92 may include fewer filters and/or may include additional filters. Additionally, the particular filters shown in FIG. 7 may be implemented in a different order. Other loop filters (either in the coding loop or after the coding loop) may also be used to smooth pixel transitions or otherwise improve the video quality. The decoded video blocks in a given frame or picture are then stored in DPB 94, which stores reference pictures used for subsequent motion compensation. DPB 94 may be part of or separate from additional memory that stores decoded video for later presentation on a display device, such as display device 32 of FIG. 1.

Figure 8:
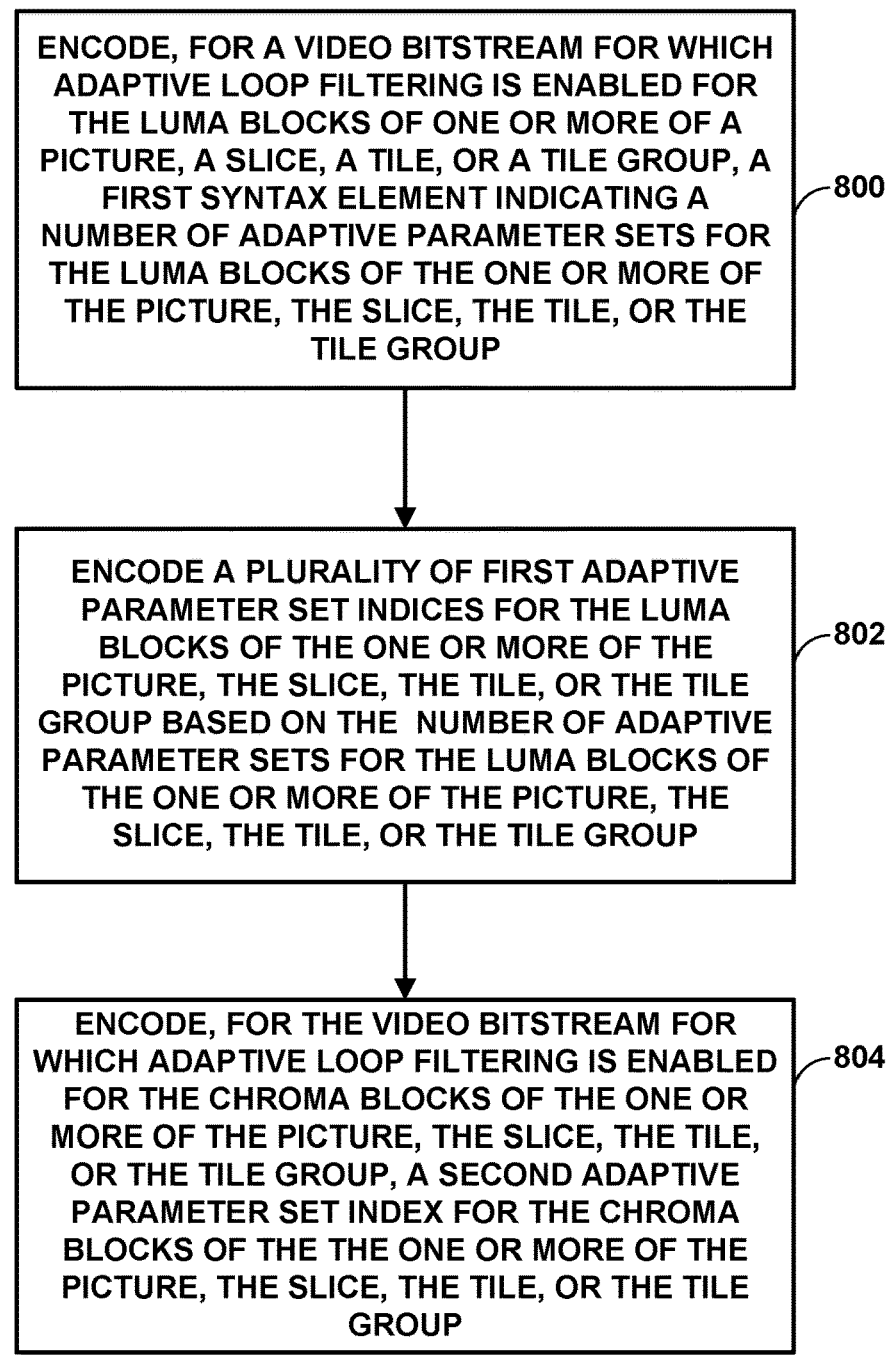
FIG. 8 is a flowchart showing an example video encoding method of the disclosure.

FIG. 8 is a flowchart showing an example video encoding method of the disclosure. The techniques of FIG. 8 may performed by one or more components of video encoder 20, including filter unit 64.

In accordance with one example of the disclosure, video encoder 20 may be configured to encode, for a video bitstream for which adaptive loop filtering is enabled for luma blocks of one or more of a picture, a slice, a tile, or a tile group, a first syntax element indicating a number of adaptive parameter sets for the luma blocks of the one or more of the picture, the slice, the tile, or the tile group (800). Video encoder 20 may be further configured to encode a plurality of first adaptive parameter set indices for the luma blocks of the one or more of the picture, the slice, the tile, or the tile group based on the number of adaptive parameter sets for the luma blocks of the one or more of the picture, the slice, the tile, or the tile group (802). For example, if five APSs are used for applying ALF to luma blocks of a slice, video encoder 20 would also encode the indices of the five APSs used. Of course, other numbers of APSs may be used for a slice. Video encoder 20 is further configured to encode, for the video bitstream for which adaptive loop filtering is enabled for chroma blocks of the one or more of the picture, the slice, the tile, or the tile group, a second adaptive parameter set index for the chroma blocks of the one or more of the picture, the slice, the tile, or the tile group (804). In this case, chroma blocks only have a single APS, and as such, only the index of the APS is encoded and signaled.

In the above example, video encoder 20 may signal the first syntax element indicating the number of adaptive parameter sets for the luma blocks of the one or more of the picture, the slice, the tile, or the tile group, the plurality of first adaptive parameter set indices for the luma blocks of the one or more of the picture, the slice, the tile, or the tile group, and the second adaptive parameter set index for the chroma blocks of the one or more of the picture, the slice, the tile, or the tile group in a picture/slice/tile/tile group header.

Figure 9:
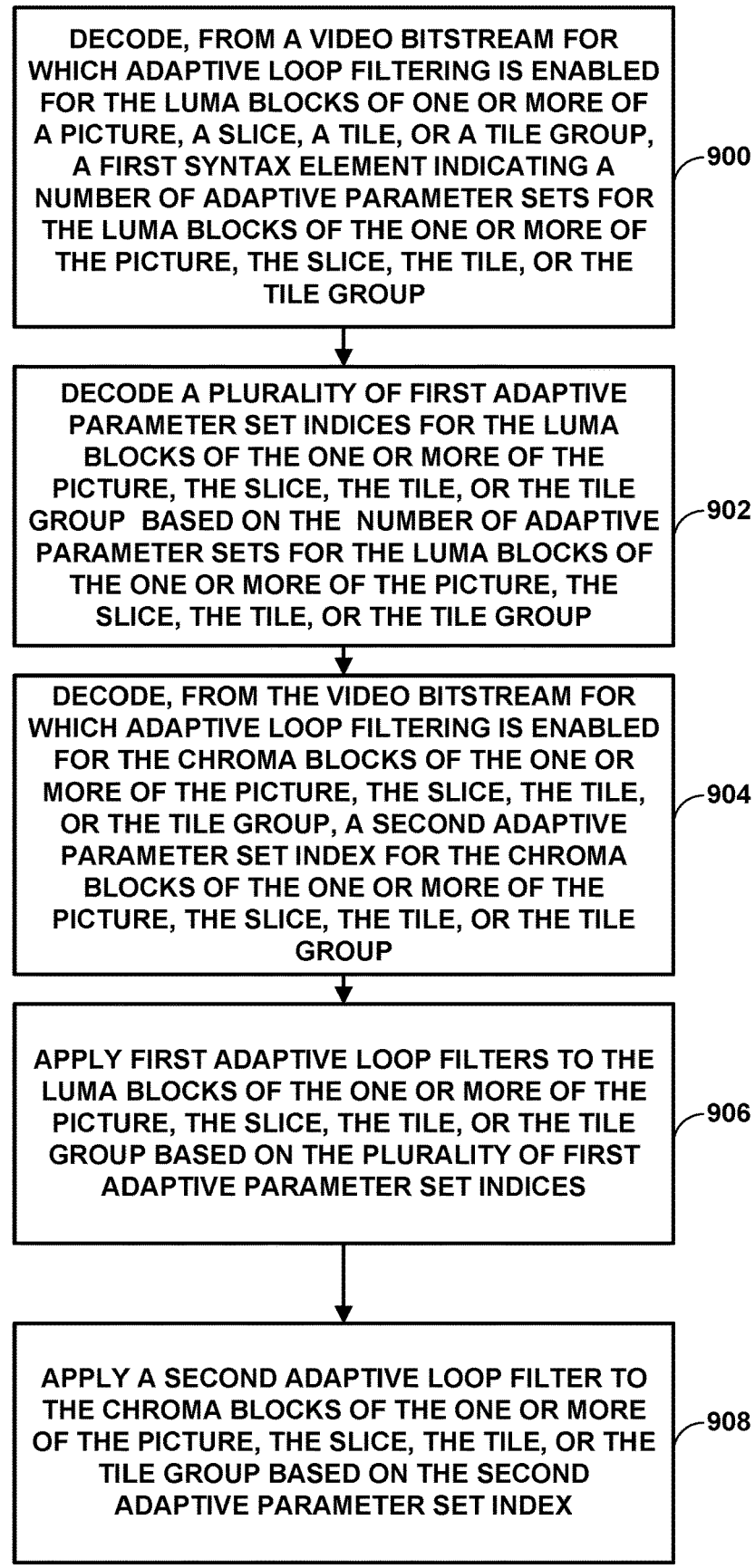
FIG. 9 is a flowchart showing an example video decoding method of the disclosure.

FIG. 9 is a flowchart showing an example video decoding method of the disclosure. The techniques of FIG. 9 may performed by one or more components of video decoder 30, including filter unit 92.

Video decoder 30 may be configured to perform techniques reciprocal to those described above for video encoder 20. For example, video decoder 30 may be configured to decode, from a video bitstream for which adaptive loop filtering is enabled for luma blocks of one or more of a picture, a slice, a tile, or a tile group, a first syntax element indicating a number of adaptive parameter sets for the luma blocks of the one or more of the picture, the slice, the tile, or the tile group (900). Video decoder 30 may further be configured to decode a plurality of first adaptive parameter set indices for the luma blocks of the one or more of the picture, the slice, the tile, or the tile group based on the number of adaptive parameter sets for the luma blocks of the one or more of the picture, the slice, the tile, or the tile group (902).

Video decoder 30 may also decode, from the video bitstream for which adaptive loop filtering is enabled for chroma blocks of the one or more of the picture, the slice, the tile, or the tile group, a second adaptive parameter set index for the chroma blocks of the one or more of the picture, the slice, the tile, or the tile group (904). Video decoder 30 may then apply first adaptive loop filters to the luma blocks of the one or more of the picture, the slice, the tile, or the tile group based on the plurality of first adaptive parameter set indices (906). For example, video decoder 30 may decode syntax elements indicating a particular APS to use for a particular luma block of the one or more of the picture, the slice, the tile, or the tile group, and then apply the ALF parameters from the indicated APS to that particular luma block. Likewise, video decoder 30 may apply a second adaptive loop filter to the chroma blocks of the one or more of the picture, the slice, the tile, or the tile group based on the second adaptive parameter set index (908). For example, video decoder 30 may apply the ALF parameters from the indicated APS of the second adaptive parameter set index to the chroma blocks.

In the above examples, video decoder 30 may receive the first syntax element indicating the number of adaptive parameter sets for the luma blocks of the one or more of the picture, the slice, the tile, or the tile group, the plurality of first adaptive parameter set indices for the luma blocks of the one or more of the picture, the slice, the tile, or the tile group, and the second adaptive parameter set index for the chroma blocks of the one or more of the picture, the slice, the tile, or the tile group in a picture/slice/tile/tile group header.

Illustrative examples of the disclosure include:

Example 1: A method of coding video data, the method comprising: determining a set of adaptive loop filter (ALF) filters from among multiple sets of ALF information for blocks of a picture.

Example 2: The method of Example 1, wherein the blocks represent coding tree units (CTUs) of the picture.

Example 3: The method of Example 1 or Example 2, wherein each respective set of ALF information includes a filter assigned to a class.

Example 4: A method of coding video data, the method comprising assigning a list of adaptive loop filter (ALF) sets across two or more pictures.

Example 5: The method of Example 4, further comprising deriving a new filter set after coding the picture, the new filter set not being included in the assigned list.

Example 6: The method of Example 5, further comprising adding the new filter set to the list.

Example 7: The method of Example 5, further comprising replacing one of the ALF sets in the list with the new filter set.

Example 8: The method of any combination of Examples 5-7, wherein deriving the new filter set comprises deriving the new filter set using data from one of a previously-coded picture, a previously-coded slice, or a previously-coded tile.

Example 9: A method of coding video data, the method comprising merging adaptive loop filter (ALF) information across multiple blocks of a picture.

Example 10: The method of Example 9, wherein the multiple blocks comprise a current block of the picture and an above neighboring block of the current block.

Example 11: The method of Example 9, wherein the multiple blocks comprise a current block of the picture and a left neighboring block of the current block.

Example 12: The method of Example 9, wherein the multiple blocks comprise a current block of the picture and a block included in a different picture from the picture.

Example 13: A method of decoding video data, the method comprising deriving a value of an adaptive loop filter (ALF) on/off flag from previously-decoded video data.

Example 14: The method of Example 13, wherein deriving the value of the ALF on/off flag comprises deriving the value based on a number of blocks included in an ALF block sharing the ALF on/off flag.

Example 15: The method of Example 14, wherein deriving the value of the ALF on/off flag comprises deriving the value further based on a number of non-zero coded block flags (CBFs) or non-zero transform coefficients in the ALF block Example 16: A video coding device comprising: a video data memory storing the video data; and processing circuitry in communication with the video data memory, the processing circuitry being configured to perform the method of any of Examples 1-15.

Example 17: The video coding device of Example 16, wherein the video coding device comprises a video decoding device.

Example 18: The video coding device of Example 16, wherein the video coding device comprises a video encoding device.

Example 19: The video encoding device of Example 18, wherein the video encoding device is configured to decode the encoded video bitstream.

Example 20: An apparatus comprising means to perform the method of any of Examples 1-15.

Example 21: A computer-readable storage medium encoded with instructions that, when executed, cause a processor of a video coding device to perform the method of any of Examples 1-15.

Example 22: Any combination of techniques described in this disclosure.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can be any of RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
   decoding, from a video bitstream for which adaptive loop filtering is enabled for luma blocks of one or more of a picture, a slice, a tile, or a tile group, a first syntax element indicating a number of adaptation parameter sets for the luma blocks of the one or more of the picture, the slice, the tile, or the tile group, wherein adaptation parameter sets include parameters for adaptive loop filters;
   decoding a plurality of first adaptation parameter set indices for the luma blocks of the one or more of the picture, the slice, the tile, or the tile group based on the number of adaptation parameter sets for the luma blocks of the one or more of the picture, the slice, the tile, or the tile group;
   decoding, from the video bitstream for which adaptive loop filtering is enabled for chroma blocks of the one or more of the picture, the slice, the tile, or the tile group, a second adaptation parameter set index for the chroma blocks of the one or more of the picture, the slice, the tile, or the tile group;
   applying first adaptive loop filters to the luma blocks of the one or more of the picture, the slice, the tile, or the tile group based on the plurality of first adaptation parameter set indices; and
   applying a second adaptive loop filter to the chroma blocks of the one or more of the picture, the slice, the tile, or the tile group based on the second adaptation parameter set index.

2. The method of claim 1, further comprising:
   receiving the first syntax element indicating the number of adaptation parameter sets for the luma blocks of the one or more of the picture, the slice, the tile, or the tile group, the plurality of first adaptation parameter set indices for the luma blocks of the one or more of the picture, the slice, the tile, or the tile group, and the second adaptation parameter set index for the chroma blocks of the one or more of the picture, the slice, the tile, or the tile group in one or more of a picture header, a slice header, a tile header, or a tile group header of the video bitstream.

3. The method of claim 1, wherein each of the number of adaptation parameter sets for the luma blocks of the one or more of the picture, the slice, the tile, or the tile group includes a respective set of luma adaptive loop filters.

4. The method of claim 3, wherein each of the number of adaptation parameter sets for the luma blocks of the one or more of the picture, the slice, the tile, or the tile group includes only the respective set of luma adaptive loop filters.

5. The method of claim 1, wherein an adaptation parameter set corresponding to the second adaptation parameter set index includes a set of chroma adaptive loop filters.

6. The method of claim 5, wherein the adaptation parameter set corresponding to the second adaptation parameter set index includes only the set of chroma adaptive loop filters.

7. The method of claim 1, further comprising:
   decoding, from the video bitstream, a second syntax element indicating if luma adaptive loop filter information for the luma blocks of the one or more of the picture, the slice, the tile, or the tile group is updated; and
   decoding, from the video bitstream, a third syntax element indicating if chroma adaptive loop filter information for the chroma blocks of the one or more of the picture, the slice, the tile, or the tile group is updated.

8. The method of claim 1, further comprising:
   displaying a picture that includes filtered luma blocks of the one or more of the picture, the slice, the tile, or the tile group and filtered chroma blocks of the one or more of the picture, the slice, the tile, or the tile group.

9. An apparatus configured to decode video data, the apparatus comprising:
   a memory configured to store luma blocks of one or more of a picture, a slice, a tile, or a tile group and chroma blocks of the one or more of the picture, the slice, the tile, or the tile group; and
   one or more processors, implemented in circuitry and in communication with the memory, the one or more processors configured to:
      decode, from a video bitstream for which adaptive loop filtering is enabled for the luma blocks of the one or more of the picture, the slice, the tile, or the tile group, a first syntax element indicating a number of adaptation parameter sets for the luma blocks of the one or more of the picture, the slice, the tile, or the tile group, wherein adaptation parameter sets include parameters for adaptive loop filters;

decode a plurality of first adaptation parameter set indices for the luma blocks of the one or more of the picture, the slice, the tile, or the tile group based on the number of adaptation parameter sets for the luma blocks of the one or more of the picture, the slice, the tile, or the tile group;

decode, from the video bitstream for which adaptive loop filtering is enabled for the chroma blocks of the one or more of the picture, the slice, the tile, or the tile group, a second adaptation parameter set index for the chroma blocks of the one or more of the picture, the slice, the tile, or the tile group;

apply first adaptive loop filters to the luma blocks of the one or more of the picture, the slice, the tile, or the tile group based on the plurality of first adaptation parameter set indices; and apply a second adaptive loop filter to the chroma blocks of the one or more of the picture, the slice, the tile, or the tile group based on the second adaptation parameter set index.

10. The apparatus of claim 9, wherein the one or more processors are further configured to:

receive the first syntax element indicating the number of adaptation parameter sets for the luma blocks of the one or more of the picture, the slice, the tile, or the tile group, the plurality of first adaptation parameter set indices for the luma blocks of the one or more of the picture, the slice, the tile, or the tile group, and the second adaptation parameter set index for the chroma blocks of the one or more of the picture, the slice, the tile, or the tile group in one or more of a picture header, a slice header, a tile header, or a tile group header of the video bitstream.

11. The apparatus of claim 9, wherein each of the number of adaptation parameter sets for the luma blocks of the one or more of the picture, the slice, the tile, or the tile group includes a respective set of luma adaptive loop filters.

12. The apparatus of claim 11, wherein each of the number of adaptation parameter sets for the luma blocks of the one or more of the picture, the slice, the tile, or the tile group includes only the respective set of luma adaptive loop filters.

13. The apparatus of claim 9, wherein an adaptation parameter set corresponding to the second adaptation parameter set index includes a set of chroma adaptive loop filters.

14. The apparatus of claim 13, wherein the adaptation parameter set corresponding to the second adaptation parameter set index includes only set of chroma adaptive loop filters.

15. The apparatus of claim 9, wherein the one or more processors are further configured to:

decode, from the video bitstream, a second syntax element indicating if luma adaptive loop filter information for the luma blocks of the one or more of the picture, the slice, the tile, or the tile group is updated; and decode, from the video bitstream, a third syntax element indicating if chroma adaptive loop filter information for the chroma blocks of the one or more of the picture, the slice, the tile, or the tile group is updated.

16. The apparatus of claim 9, further comprising:

a display configured to display a picture that includes filtered luma blocks of the one or more of the picture, the slice, the tile, or the tile group and filtered chroma blocks of the one or more of the picture, the slice, the tile, or the tile group.

17. An apparatus configured to decode video data, the apparatus comprising:

means for decoding, from a video bitstream for which adaptive loop filtering is enabled for luma blocks of one or more of a picture, a slice, a tile, or a tile group, a first syntax element indicating a number of adaptation parameter sets for the luma blocks of the one or more of the picture, the slice, the tile, or the tile group, wherein adaptation parameter sets include parameters for adaptive loop filters;

means for decoding a plurality of first adaptation parameter set indices for the luma blocks of the one or more of the picture, the slice, the tile, or the tile group based on the number of adaptation parameter sets for the luma blocks of the one or more of the picture, the slice, the tile, or the tile group;

means for decoding, from the video bitstream for which adaptive loop filtering is enabled for chroma blocks of the one or more of the picture, the slice, the tile, or the tile group, a second adaptation parameter set index for the chroma blocks of the one or more of the picture, the slice, the tile, or the tile group;

means for applying first adaptive loop filters to the luma blocks of the one or more of the picture, the slice, the tile, or the tile group based on the plurality of first adaptation parameter set indices; and means for applying a second adaptive loop filter to the chroma blocks of the one or more of the picture, the slice, the tile, or the tile group based on the second adaptation parameter set index.

18. A non-transitory computer-readable storage medium storing instructions that, when executed, cause one or more processors of a device configured to decode video data to:

decode, from a video bitstream for which adaptive loop filtering is enabled for luma blocks of one or more of a picture, a slice, a tile, or a tile group, a first syntax element indicating a number of adaptation parameter sets for the luma blocks of the one or more of the picture, the slice, the tile, or the tile group, wherein adaptation parameter sets include parameters for adaptive loop filters;

decode a plurality of first adaptation parameter set indices for the luma blocks of the one or more of the picture, the slice, the tile, or the tile group based on the number of adaptation parameter sets for the luma blocks of the one or more of the picture, the slice, the tile, or the tile group;

decode, from the video bitstream for which adaptive loop filtering is enabled for chroma blocks of the one or more of the picture, the slice, the tile, or the tile group, a second adaptation parameter set index for the chroma blocks of the one or more of the picture, the slice, the tile, or the tile group;

apply first adaptive loop filters to the luma blocks of the one or more of the picture, the slice, the tile, or the tile group based on the plurality of first adaptation parameter set indices; and apply a second adaptive loop filter to the chroma blocks of the one or more of the picture, the slice, the tile, or the tile group based on the second adaptation parameter set index.

19. A method of encoding video data, the method comprising:

encoding, for a video bitstream for which adaptive loop filtering is enabled for luma blocks of one or more of a picture, a slice, a tile, or a tile group, a first syntax element indicating a number of adaptation parameter sets for the luma blocks of the one or more of the picture, the slice, the tile, or the tile group, wherein adaptation parameter sets include parameters for adaptive loop filters;

encoding a plurality of first adaptation parameter set indices for the luma blocks of the one or more of the picture, the slice, the tile, or the tile group based on the number of adaptation parameter sets for the luma blocks of the one or more of the picture, the slice, the tile, or the tile group; and encoding, for the video bitstream for which adaptive loop filtering is enabled for chroma blocks of the one or more of the picture, the slice, the tile, or the tile group, a second adaptation parameter set index for the chroma blocks of the one or more of the picture, the slice, the tile, or the tile group.

20. The method of claim 19, further comprising:

signaling the first syntax element indicating the number of adaptation parameter sets for the luma blocks of the one or more of the picture, the slice, the tile, or the tile group, the plurality of first adaptation parameter set indices for the luma blocks of the one or more of the picture, the slice, the tile, or the tile group, and the second adaptation parameter set index for the chroma blocks of the one or more of the picture, the slice, the tile, or the tile group in one or more of a picture header, a slice header, a tile header, or a tile group header of the video bitstream.

21. The method of claim 19, wherein each of the number of adaptation parameter sets for the luma blocks of the one or more of the picture, the slice, the tile, or the tile group includes a respective set of luma adaptive loop filters.

22. The method of claim 21, wherein each of the number of adaptation parameter sets for the luma blocks of the one or more of the picture, the slice, the tile, or the tile group includes only the respective set of luma adaptive loop filters.

23. The method of claim 19, wherein an adaptation parameter set corresponding to the second adaptation parameter set index includes a set of chroma adaptive loop filters.

24. The method of claim 23, wherein the adaptation parameter set corresponding to the second adaptation parameter set index includes only set of chroma adaptive loop filters.

25. The method of claim 19, further comprising:

encoding a second syntax element indicating if luma adaptive loop filter information for the luma blocks of the one or more of the picture, the slice, the tile, or the tile group is updated; and encoding a third syntax element indicating if chroma adaptive loop filter information for the chroma blocks of the one or more of the picture, the slice, the tile, or the tile group is updated.

26. The method of claim 19, further comprising:

capturing a picture that includes the luma blocks of the one or more of the picture, the slice, the tile, or the tile group and the chroma blocks of the one or more of the picture, the slice, the tile, or the tile group.

27. An apparatus configured to encode video data, the apparatus comprising:

a memory configured to store luma blocks of one or more of a picture, a slice, a tile, or a tile group and chroma blocks of the one or more of the picture, the slice, the tile, or the tile group; and one or more processors, implemented in circuitry and in communication with the memory, the one or more processors configured to:

encode, for a video bitstream for which adaptive loop filtering is enabled for the luma blocks of the one or more of the picture, the slice, the tile, or the tile group, a first syntax element indicating a number of adaptation parameter sets for the luma blocks of the one or more of the picture, the slice, the tile, or the tile group, wherein adaptation parameter sets include parameters for adaptive loop filters;

encode a plurality of first adaptation parameter set indices for the luma blocks of the one or more of the picture, the slice, the tile, or the tile group based on the number of adaptation parameter sets for the luma blocks of the one or more of the picture, the slice, the tile, or the tile group; and encode, for the video bitstream for which adaptive loop filtering is enabled for the chroma blocks of the one or more of the picture, the slice, the tile, or the tile group, a second adaptation parameter set index for the chroma blocks of the one or more of the picture, the slice, the tile, or the tile group.

28. The apparatus of claim 27, wherein the one or more processors are further configured to:

signal the first syntax element indicating the number of adaptation parameter sets for the luma blocks of the one or more of the picture, the slice, the tile, or the tile group, the plurality of first adaptation parameter set indices for the luma blocks of the one or more of the picture, the slice, the tile, or the tile group, and the second adaptation parameter set index for the chroma blocks of the one or more of the picture, the slice, the tile, or the tile group in one or more of a picture header, a slice header, a tile header, or a tile group header of the video bitstream.

29. The apparatus of claim 27, wherein each of the number of adaptation parameter sets for the luma blocks of the one or more of the picture, the slice, the tile, or the tile group includes a respective set of luma adaptive loop filters.

30. The apparatus of claim 29, wherein each of the number of adaptation parameter sets for the luma blocks of the one or more of the picture, the slice, the tile, or the tile group includes only the respective set of luma adaptive loop filters.

31. The apparatus of claim 27, wherein an adaptation parameter set corresponding to the second adaptation parameter set index includes a set of chroma adaptive loop filters.

32. The apparatus of claim 31, wherein the adaptation parameter set corresponding to the second adaptation parameter set index includes only set of chroma adaptive loop filters.

33. The apparatus of claim 27, wherein the one or more processors are further configured to:

encode a second syntax element indicating if luma adaptive loop filter information for the luma blocks of the one or more of the picture, the slice, the tile, or the tile group is updated; and encode a third syntax element indicating if chroma adaptive loop filter information for the chroma blocks of the one or more of the picture, the slice, the tile, or the tile group is updated.

34. The apparatus of claim 27, further comprising:

a camera configured to capture a picture that includes the luma blocks of the one or more of the picture, the slice, the tile, or the tile group and the chroma blocks of the one or more of the picture, the slice, the tile, or the tile group.

35. An apparatus configured to encode video data, the apparatus comprising:

means for encoding, for a video bitstream for which adaptive loop filtering is enabled for luma blocks of one or more of a picture, a slice, a tile, or a tile group, a first syntax element indicating a number of adaptation parameter sets for the luma blocks of the one or more of the picture, the slice, the tile, or the tile group, wherein adaptation parameter sets include parameters for adaptive loop filters;

means for encoding a plurality of first adaptation parameter set indices for the luma blocks of the one or more of the picture, the slice, the tile, or the tile group based on the number of adaptation parameter sets for the luma blocks of the one or more of the picture, the slice, the tile, or the tile group; and means for encoding, for the video bitstream for which adaptive loop filtering is enabled for chroma blocks of the one or more of the picture, the slice, the tile, or the tile group, a second adaptation parameter set index for the chroma blocks of the one or more of the picture, the slice, the tile, or the tile group.

36. A non-transitory computer-readable storage medium storing instructions that, when executed, cause one or more processors of a device configured to encode video data to:

encode, for a video bitstream for which adaptive loop filtering is enabled for luma blocks of one or more of a picture, a slice, a tile, or a tile group, a first syntax element indicating a number of adaptation parameter sets for the luma blocks of the one or more of the picture, the slice, the tile, or the tile group, wherein adaptation parameter sets include parameters for adaptive loop filters;

encode a plurality of first adaptation parameter set indices for the luma blocks of the one or more of the picture, the slice, the tile, or the tile group based on the number of adaptation parameter sets for the luma blocks of the one or more of the picture, the slice, the tile, or the tile group; and encode, for the video bitstream for which adaptive loop filtering is enabled for chroma blocks of the one or more of the picture, the slice, the tile, or the tile group, a second adaptation parameter set index for the chroma blocks of the one or more of the picture, the slice, the tile, or the tile group.

* * * * *